US007102315B2

(12) United States Patent
Nakata et al.

(10) Patent No.: US 7,102,315 B2
(45) Date of Patent: Sep. 5, 2006

(54) ROBOT ARM CONTROL METHOD AND CONTROL DEVICE

(75) Inventors: Hiroyuki Nakata, Osaka (JP); Naoto Masunaga, Osaka (JP); Atsumi Hashimoto, Osaka (JP); Yasushi Mukai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/546,712

(22) PCT Filed: Jul. 2, 2004

(86) PCT No.: PCT/JP2004/009781

§ 371 (c)(1),
(2), (4) Date: Aug. 24, 2005

(87) PCT Pub. No.: WO2005/009692

PCT Pub. Date: Feb. 3, 2005

(65) Prior Publication Data

US 2006/0071625 A1 Apr. 6, 2006

(30) Foreign Application Priority Data

Jul. 29, 2003 (JP) ............................ 2003-281619
Mar. 24, 2004 (JP) ............................ 2004-091461
Mar. 30, 2004 (JP) ............................ 2004-098949

(51) Int. Cl.
*G05B 6/02* (2006.01)
*B25J 13/00* (2006.01)

(52) U.S. Cl. .................. 318/568.22; 318/621; 318/632

(58) Field of Classification Search ................ 318/567, 318/568.1, 568.11, 568.17, 568.18, 568.21, 318/568.22, 609, 610, 619, 621, 632; 901/9, 901/23, 25, 45, 49

See application file for complete search history.

(56) References Cited

U.S. PATENT DOCUMENTS 4,500,823 A * 2/1985 Walrath ...................... 318/632
4,925,312 A * 5/1990 Onaga et al. ............... 700/261
5,134,354 A * 7/1992 Yamamoto et al. ......... 318/609
5,418,440 A 5/1995 Sakaguchi et al.
5,767,648 A * 6/1998 Morel et al. ............. 318/568.1
5,994,864 A 11/1999 Inoue et al.
6,298,283 B1 10/2001 Kato et al.
6,429,617 B1 8/2002 Sano et al.
6,899,705 B1 * 5/2005 Niemeyer ...................... 606/1
6,974,449 B1 * 12/2005 Niemeyer ...................... 606/1

FOREIGN PATENT DOCUMENTS

| | | |
|---|---|---|
| JP | 60-167780 | 8/1985 |
| JP | 6-83403 | 3/1994 |
| JP | 8-155868 | 6/1996 |
| JP | 9-179632 | 7/1997 |
| JP | 10-180663 | 7/1998 |
| JP | 2871993 | 1/1999 |
| JP | 11-143548 | 5/1999 |
| JP | 2000-10635 | 1/2000 |
| JP | 2000-52286 | 2/2000 |
| JP | 2001-105358 | 4/2001 |
| JP | 3212571 | 7/2001 |
| JP | 2002-117618 | 4/2002 |
| JP | 2002-283276 | 10/2002 |

* cited by examiner

*Primary Examiner*—Bentsu Ro
(74) *Attorney, Agent, or Firm*—Pearne & Gordon LLP

(57) ABSTRACT

When either a command value or an actually measured value is appropriately selected as an angular velocity used for the frictional torque calculation, the frictional compensation can be made valid at all times in both the case in which a robot is actively operated according to an angular velocity command and the case in which the robot is passively operated being pushed by an external force. In the case where a motor rotating direction and a collision direction are reverse to each other after a collision has been detected, the control mode is switched from the positional control to the electric current control and a torque, the direction of which is reverse to the direction of the motor rotation is generated by the motor, so that the motor rotating speed can be reduced and the collision energy can be alleviated. After that, when the motor rotating speed is reduced to a value not more than the setting value, the control mode is switched to the compliance control and the distortion caused in a reduction gear is dissolved. On the other hand, in the case where the motor rotating direction and the collision direction are the same, the control mode is directly switched from the positional control to the compliance control without passing through the electric current control. When the robot is operated whole following a collision force, the collision force can be alleviated.

13 Claims, 25 Drawing Sheets

MOTOR + ACTUAL LOAD
MOTOR ROTARY ANGLE COMMAND θ com
FEEDBACK CONTROLLER
ELECTRIC CURRENT RESTRICTION
Icom
Im
Kt
τ mm
τ μ + τ g + τ dyn + τ dis
1/Js²
MOTOR ROTARY ANGLE θ fb
Iml
1/Kt
α com
J
τ dyn
ω com
τ μ
SPEED SWITCHING DEVICE
ω
FRICTIONAL CALCULATION
DAYNAMIC TORQUE CALCULATION
ω fb
s
ROTARY ANGLE OF ANOTHER AXIS MOTOR ROTARY ANGLE COMMAND θ com
1
FEEDBACK CONTROLLER
2
ELECTRIC CURRENT RESTRICTION
3
Icom
4
Im
5
MOTOR + ACTUAL LOAD
6
Kt
7
τ mm
8
τ μ + τ g + τ dyn + τ dis
9
1
Js2
10
MOTOR ROTARY ANGLE θ fb
11
s
12
ω com
13
s
14
α com
15
J
16
Iml
17
1/Kt
18
τ dyn
19
τ μ
20
FRICTIONAL CALCULATION
21
DAYNAMIC TORQUE CALCULATION
22
ω fb
23
s
24
ROTARY ANGLE OF ANOTHER AXIS
25
26
ω
27
Kμ
28
+
−

12
MOTOR + ACTUAL LOAD
τ dyn + τ dis
+ τ μ × sgn(ω)
17
11
MOTOR ROTARY
ANGLE COMMAND
θ ref
14
CONTROLLER
15
ELECTRIC
CURRENT
Im
16
Kt
18
1
s(Js+D)
13
MOTOR
ROTARY
ANGLE
θ fb
19
COLLISION TORQUE
CALCULATING SECTION
Kt
16
s²J+sD+ τ dyn
+ τ μa×sgn(ω)
COLLISION TORQUE
DETECTION VALUE
τ disa
20

ACTUALLY MEASURED VALUE
y = 0.079x + 0.300
y = −0.081x + 0.300
DYNAMIC TORQUE [N·m]
DYNAMIC FRICTION TORQUE [N·m]
−6
−4
−2
0
2
4
6
0
0.1
0.2
0.3
0.4
0.5
0.6
0.7
0.8

*FIG. 8*

| | FIG. 4 | FIG. 5 |
|---|---|---|
| A | 0.207 | 0.079 |
| B | 0.500 | 0.300 |
| C | 0.175 | 0.000 |
| D | 0.545 | 0.000 |
| E | −0.221 | −0.081 |
| F | 0.480 | 0.300 |
| $\tau$ th | 0.880 | 0.000 |

MOTOR SPEED [rad/s]
21
18
15
12
9
6
3
0
-3
1.5
1
0.5
0
-0.5
-1
-1.5
-2
-2.5
DYNAMIC TORQUE [N · m]
0
1
2
3
4
5
TIME [s]
ERROR (4)
ERROR (5)
ERROR (4)
τ mm (1)
τ ml (2)
SPEED (3)
OPERATION (1)
OPERATION (2)

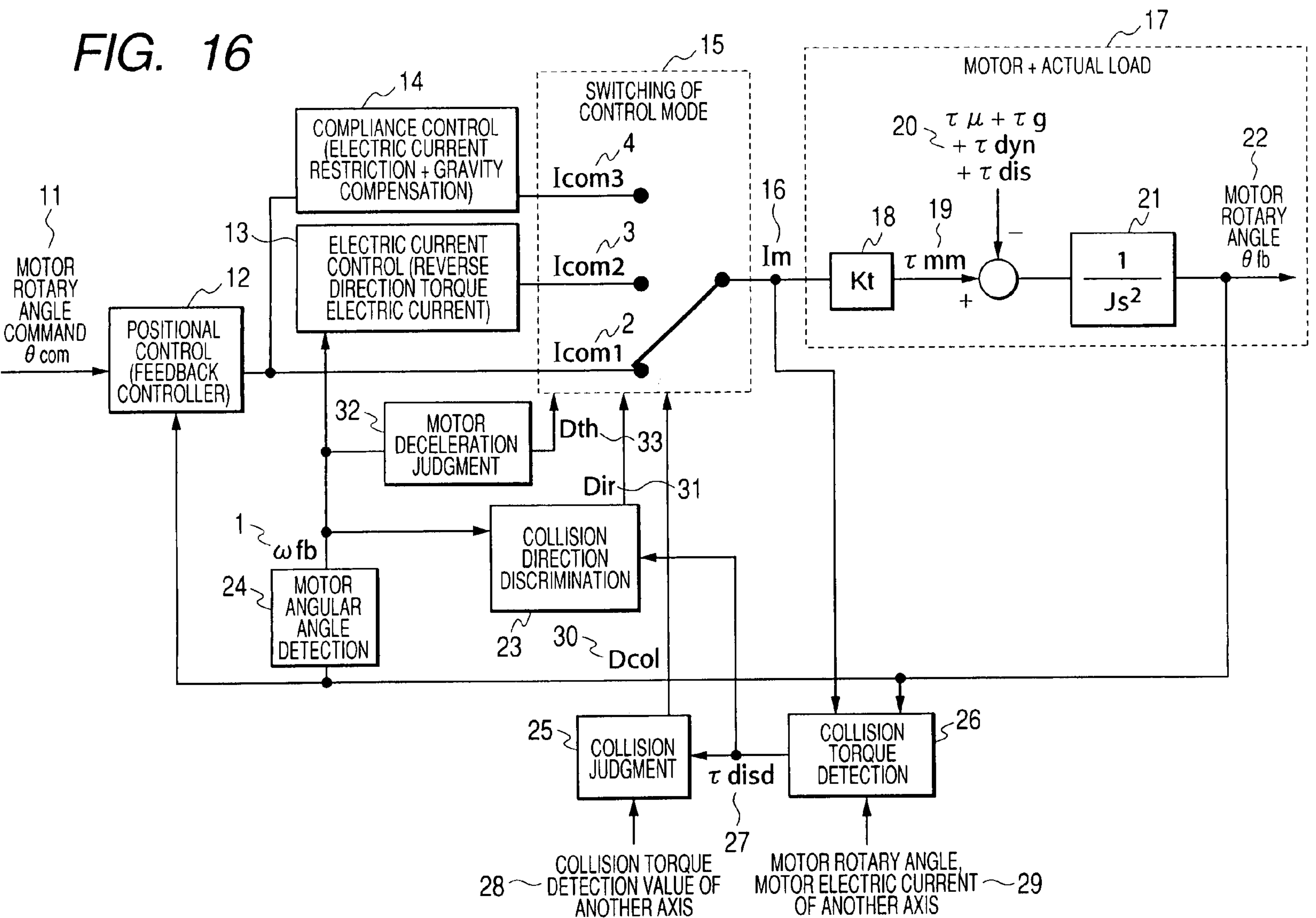
FIG. 16
11
MOTOR ROTARY ANGLE COMMAND θ com
12
POSITIONAL CONTROL (FEEDBACK CONTROLLER)
13
14
COMPLIANCE CONTROL (ELECTRIC CURRENT RESTRICTION + GRAVITY COMPENSATION)
ELECTRIC CURRENT CONTROL (REVERSE DIRECTION TORQUE ELECTRIC CURRENT)
15
SWITCHING OF CONTROL MODE
4
Icom3
3
Icom2
2
Icom1
16
Im
17
MOTOR + ACTUAL LOAD
20
τ μ + τ g + τ dyn + τ dis
18
Kt
19
τ mm
21
1
Js2
22
MOTOR ROTARY ANGLE θ fb
32
MOTOR DECELERATION JUDGMENT
Dth
33
Dir
31
1
ω fb
COLLISION DIRECTION DISCRIMINATION
24
MOTOR ANGULAR ANGLE DETECTION
23
30
Dcol
25
COLLISION JUDGMENT
τ disd
26
COLLISION TORQUE DETECTION
27
28
COLLISION TORQUE DETECTION VALUE OF ANOTHER AXIS
MOTOR ROTARY ANGLE, MOTOR ELECTRIC CURRENT OF ANOTHER AXIS
29

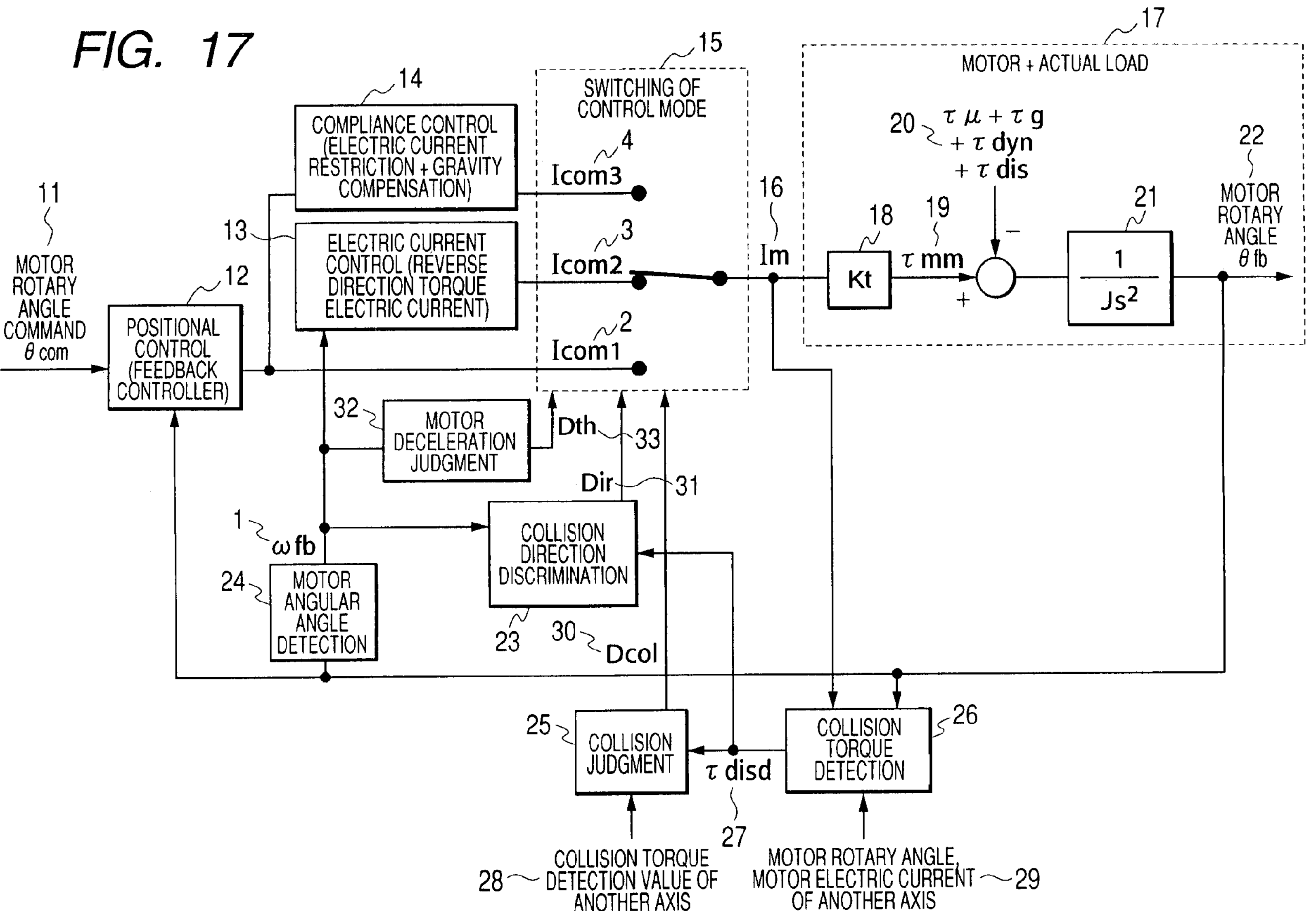
FIG. 17
MOTOR ROTARY ANGLE COMMAND θ com
POSITIONAL CONTROL (FEEDBACK CONTROLLER)
COMPLIANCE CONTROL (ELECTRIC CURRENT RESTRICTION + GRAVITY COMPENSATION)
ELECTRIC CURRENT CONTROL (REVERSE DIRECTION TORQUE ELECTRIC CURRENT)
SWITCHING OF CONTROL MODE
Icom3
Icom2
Icom1
MOTOR DECELERATION JUDGMENT
Dth
Dir
ωfb
MOTOR ANGULAR ANGLE DETECTION
COLLISION DIRECTION DISCRIMINATION
Dcol
Im
MOTOR + ACTUAL LOAD
Kt
τ mm
τ μ + τ g + τ dyn + τ dis
1/Js²
MOTOR ROTARY ANGLE θ fb
COLLISION JUDGMENT
τ disd
COLLISION TORQUE DETECTION
COLLISION TORQUE DETECTION VALUE OF ANOTHER AXIS
MOTOR ROTARY ANGLE, MOTOR ELECTRIC CURRENT OF ANOTHER AXIS

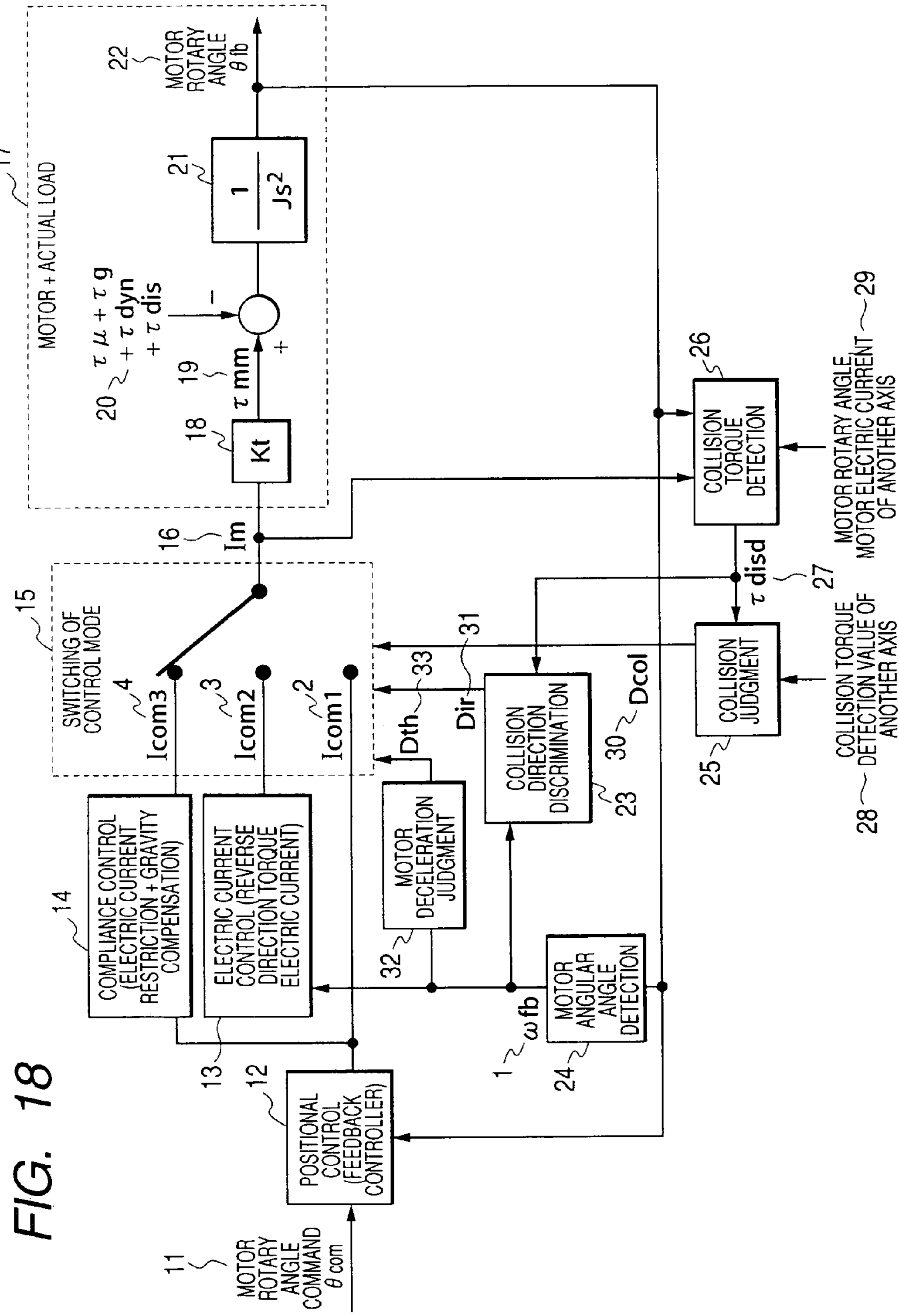
FIG. 18
MOTOR + ACTUAL LOAD
MOTOR ROTARY ANGLE θ fb
SWITCHING OF CONTROL MODE
Icom3
Icom2
Icom1
Im
Kt
τ mm
τ μ + τ g + τ dyn + τ dis
1 / Js²
COMPLIANCE CONTROL (ELECTRIC CURRENT RESTRICTION + GRAVITY COMPENSATION)
ELECTRIC CURRENT CONTROL (REVERSE DIRECTION TORQUE ELECTRIC CURRENT)
MOTOR DECELERATION JUDGMENT
COLLISION DIRECTION DISCRIMINATION
COLLISION JUDGMENT
COLLISION TORQUE DETECTION
τ disd
Dth
Dir
Dcol
MOTOR ROTARY ANGLE, MOTOR ELECTRIC CURRENT OF ANOTHER AXIS
COLLISION TORQUE DETECTION VALUE OF ANOTHER AXIS
POSITIONAL CONTROL (FEEDBACK CONTROLLER)
MOTOR ANGULAR ANGLE DETECTION
ω fb
MOTOR ROTARY ANGLE COMMAND θ com

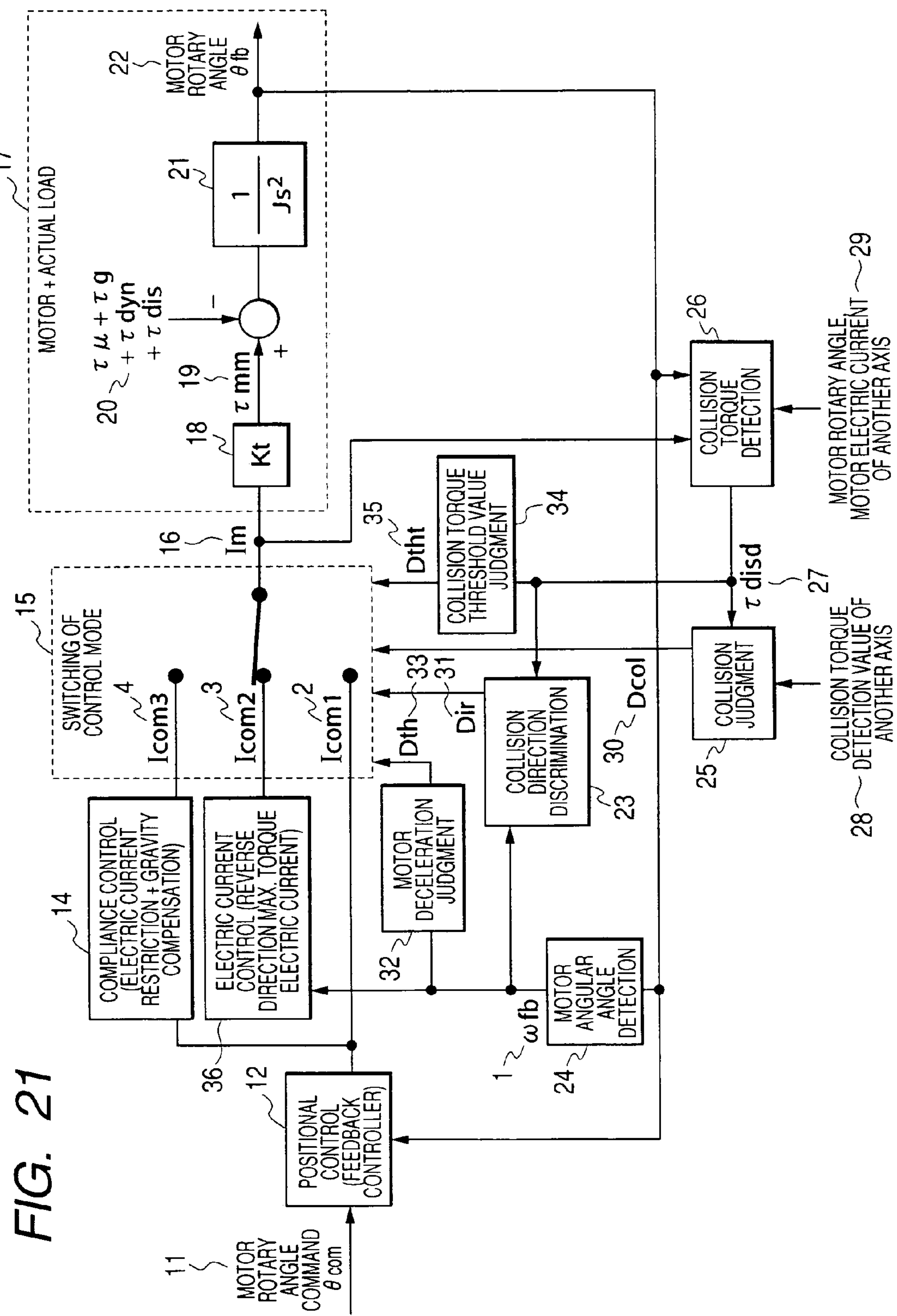

FIG. 21
11
MOTOR ROTARY ANGLE COMMAND θ com
12
POSITIONAL CONTROL (FEEDBACK CONTROLLER)
36
14
COMPLIANCE CONTROL (ELECTRIC CURRENT RESTRICTION + GRAVITY COMPENSATION)
ELECTRIC CURRENT CONTROL (REVERSE DIRECTION MAX. TORQUE ELECTRIC CURRENT)
4
Icom3
3
Icom2
2
Icom1
15
SWITCHING OF CONTROL MODE
32
MOTOR DECELERATION JUDGMENT
Dth
33
31
Dir
23
COLLISION DIRECTION DISCRIMINATION
30
Dcol
1
ωfb
24
MOTOR ANGULAR ANGLE DETECTION
25
COLLISION JUDGMENT
28
COLLISION TORQUE DETECTION VALUE OF ANOTHER AXIS
τ disd
27
34
COLLISION TORQUE THRESHOLD VALUE JUDGMENT
35
Dtht
16
Im
26
COLLISION TORQUE DETECTION
MOTOR ROTARY ANGLE, MOTOR ELECTRIC CURRENT OF ANOTHER AXIS
29
17
MOTOR + ACTUAL LOAD
18
Kt
19
τ mm
20
τ μ + τ g + τ dyn + τ dis
+
−
21
1/Js²
22
MOTOR ROTARY ANGLE θ fb

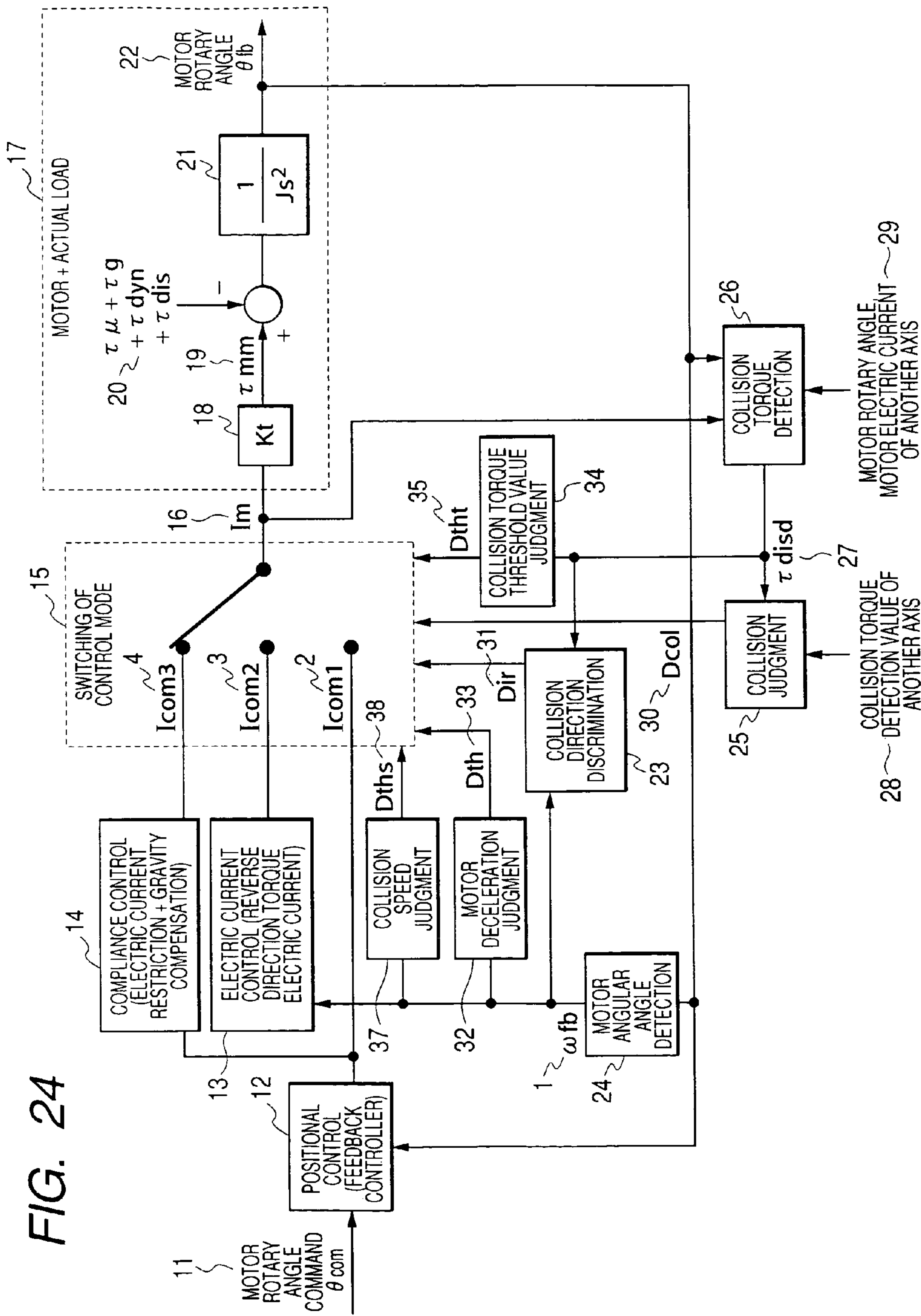
FIG. 24
11 MOTOR ROTARY ANGLE COMMAND θcom
12 POSITIONAL CONTROL (FEEDBACK CONTROLLER)
13
14 COMPLIANCE CONTROL (ELECTRIC CURRENT RESTRICTION + GRAVITY COMPENSATION)
ELECTRIC CURRENT CONTROL (REVERSE DIRECTION TORQUE DIRECTION ELECTRIC CURRENT)
37 COLLISION SPEED JUDGMENT
32 MOTOR DECELERATION JUDGMENT
1 ωfb
24 MOTOR ANGULAR ANGLE DETECTION
15 SWITCHING OF CONTROL MODE
4 Icom3
3 Icom2
2 Icom1
38 Dths
33 Dth
31 Dir
30 Dcol
23 COLLISION DIRECTION DISCRIMINATION
35 Dtht
34 COLLISION TORQUE THRESHOLD VALUE JUDGMENT
25 COLLISION JUDGMENT
28 COLLISION TORQUE DETECTION VALUE OF ANOTHER AXIS
27 τ disd
26 COLLISION TORQUE DETECTION
29 MOTOR ROTARY ANGLE, MOTOR ELECTRIC CURRENT OF ANOTHER AXIS
16 Im
17 MOTOR + ACTUAL LOAD
18 Kt
19 τ mm
20 τ μ + τ g + τ dyn + τ dis
21 1/Js²
22 MOTOR ROTARY ANGLE θ fb

ROBOT ARM CONTROL METHOD AND CONTROL DEVICE

TECHNICAL FIELD

The present invention relates to a method and device of controlling a robot arm driven by a motor. More particularly, the present invention relates to a technique of compliance servo control of controlling a robot arm, that is, the present invention relates to a method and device of controlling a stoppage of a robot arm conducted after a collision of the robot arm against an object has been detected.

BACKGROUND ART

Recently, robots have been used for not only the industrial field but also the public consumer field. Therefore, it has become important to ensure the safety. However, according to a stoppage means for stopping a robot arm by detecting an external force, which is given to the robot at the time of collision, with a force sensor, the manufacturing cost and the weight are undesirably increased. Accordingly, it is desired to enhance the performance of compliance servo control including the collision detection, in which no sensors are used, and the control of stopping motion.

Concerning the method of realizing compliance servo control without using sensors, it is common to adopt a method in which even when a positional deviation is increased in the positional feed back control, an excessively high torque is not generated in a motor by suppressing the increase in the electric current command with respect to an increase in the positional deviation.

According to a quantity of suppression of the electric current command in the feedback control, an intensity of torque generated by the motor is also suppressed, so that the compliance can be enhanced.

A means for suppressing the electric current command in feedback control is disclosed in JP-A-09-179632 (U.S. Pat. No. 5,994,864) in which the electric current command is limited. A means for suppressing the electric current command in feedback control is also disclosed in JP-A-08-155868 in which the feedback gain is decreased.

As described above, in order to enhance the compliance of a robot arm, it is important to suppress the electric current command in feedback control. Unless the electric current is suppressed in feedback control, the compliance of a robot arm becomes close to the common servo rigidity. Therefore, the compliance of servo control is lowered.

However, in order to operate a robot arm, it is necessary to generate a drive torque by a motor in which consideration is given to the inertia torque, the friction torque and the gravity torque. Therefore, when the robot arm is operated only by feedback control, it is difficult to suppress an electric current command of the motor.

FIG. 3 is a block diagram showing a conventional method of controlling the friction compensation in which the actual velocity is used. In the drawing, reference numeral 1 is a motor rotary angle command $\theta_{com}$, reference numeral 2 is a feedback controller, reference numeral 3 is an electric current restricting means, reference numeral 4 is a feedback control electric current command $I_{com}$, reference numeral 5 is a motor current $I_m$, reference numeral 6 is a range representing (motor+actual load), reference numeral 7 is a motor torque constant $K_t$, reference numeral 8 is a motor generation torque τmm, reference numeral 9 is an external force τμ+τdyn+τdis given to a motor, reference numeral 10 is a transfer function of motor inertia, reference numeral 11 is a motor rotation angle $\theta_{fb}$, reference numeral 12 is a differential operator, reference numeral 13 is a motor angular velocity command $\omega_{com}$, reference numeral 14 is a differential operator, reference numeral 15 is a motor angular acceleration command $\alpha_{com}$, reference numeral 16 is a motor inertia (rotor+reduction gear primary side) J, reference numeral 17 is a motor electric current $I_{ml}$ necessary for the operation of a robot, reference numeral 18 is an inverse number $1/K_t$ of the motor torque constant, reference numeral 19 is a calculated value of dynamic torque τdyn, reference numeral 20 is a calculated value of friction τμ, reference numeral 21 is a friction calculation block, reference numeral 22 is a dynamic calculation block, reference numeral 23 is a motor angular velocity $\omega_{fb}$, reference numeral 24 is a differential operator, and reference numeral 25 is a rotary angle of the other axis.

The motor generation torque τm, which is generated at the time of operation of the robot, is expressed by the expression (1) when it is seen from the motor drive side. The motor generation torque cm is expressed by the expression (2) when it is seen from the load side.

$$\tau mm = K_t * I_m \quad (1)$$

$$\tau ml = J*\alpha + \tau\mu + \tau dyn + \tau dis \quad (2)$$

In this case, reference marks used in the expressions (1) and (2) are defined as follows.

$K_t$: Motor torque constant $I_m$: Motor electric current

α: Motor angular acceleration

ω: Motor angular velocity

J: Motor inertia (rotor+primary side of reduction gear)

τμ: Friction torque (converted into motor shaft end)

τdyn: Dynamic torque (Dynamic torque is a sum of gravity torque, inertia force, Coriolis force and elastic force, which is converted into a motor shaft end.)

τdis: Disturbance torque (Disturbance torque is a contact torque given from the outside or a parameter error. Disturbance torque is converted into a motor shaft end.)

When the disturbance torque τdis=0 in the expression (2), it is possible to calculate the motor electric current $I_{ml}$, which is necessary for the operation of the robot arm, by the expressions (1) and (2).

$$I_{ml} = J*\alpha + \tau\mu + \tau dyn)/K_t \quad (3)$$

As shown in FIG. 3, when $I_{ml}$ calculated by this expression (3) is added to the feedback electric current command $I_{com}$, if the disturbance torque τdis=0, even when the feedback electric current is 0, it becomes possible for the robot arm to follow to a target position.

In FIG. 3, the feedback electric current command $I_{com}$ (4) can be found when the PID calculation is conducted by the feedback controller (2) from the rotary angle command $\theta_{com}$ (1) and the actual motor rotary angle $\theta_{fb}$ and the electric restriction (3) is made. Concerning the means for restricting the electric current (3), there are provided a system in which the limit is set and a system in which the feedback gain is lowered.

On the other hand, $I_{ml}$ (17) calculated by the expression (3) can be obtained as follows. The angular acceleration $\theta_{com}$ (15), which is obtained when the motor rotation command $\theta_{com}$ (1) is subjected to the differential calculation (12) and (14) twice, is multiplied by the motor inertia J (16). The friction torque τμ (20) and the dynamic torque τdyn (19) are added to the thus obtained value. The obtained value is multiplied by the inverse number $1/K_t$ (18) of the motor torque constant, and $I_{ml}$ (17) calculated by the expression (3) can be obtained.

That is, when the motor electric current $I_{ml}$ necessary for the operation of a robot can be accurately calculated by the expression (3), it becomes possible to suppress an electric current command in feedback control. Therefore, the compliance of the robot can be enhanced.

However, actually, an error of calculation is caused by the parameter error of the expression (3). Therefore, when the electric current is intensely suppressed in feedback control, it becomes impossible to compensate the error, and the robot arm becomes out of control and the positional deviation can not be decreased, that is, there is a possibility that the robot arm runs away.

When the electric current command is made to be 0 in the feedback control, if the positional deviation is extended by the contact torque given from the outside, a force to return the robot arm to the initial position is not generated.

As explained above, how much the electric current command by feedback control can be suppressed depends on the calculation accuracy of the expression (3).

The friction torque $\tau\mu$, which is one of the primary items of the motor electric current $I_{ml}$ calculated by the expression (3) and necessary for the operation of the robot, includes: the stationary friction torque $\tau\mu s$ and the dynamic friction torque $\tau\mu m$ which are determined by the acting direction of a force; and the viscous friction torque $\tau\mu d$ (coefficient D of viscosity) which is proportional to the velocity.

$$\tau\mu = \tau\mu s + \tau\mu m + \tau\mu d \tag{4}$$

However, in the expression (4), each item is calculated as follows.

$$\tau\mu s = \tau\mu s0 * sgn1(\omega) \tag{5}$$

$$sgn1(\omega) = \begin{cases} 1 & (\omega = 0, \text{ moving direction} > 0) \\ 0 & (\omega \neq 0) \\ -1 & (\omega = 0, \text{ moving direction} < 0) \end{cases}$$

$$\tau\mu m = \tau\mu m0 * sgn2(\omega) \tag{6}$$

$$sgn2(\omega) = \begin{cases} -1 & (\omega < 0) \\ 0 & (\omega = 0) \\ 1 & (\omega > 0 \end{cases}$$

$$\tau\mu d = D * \omega \tag{7}$$

As can be seen from the expressions (5) to (7), all friction torque is calculated depending upon the angular velocity $\omega$.

Concerning the angular velocity $\omega$ used for the calculation of the friction torque, the angular velocity $\omega_{FB}$, which is subjected to feedback control, is used in the above conventional example (JP-A-9-179632). In another conventional example (JP-A-10-180663), the angular velocity command $\omega_{com}$, which is obtained when the positional command $\theta_{com}$ is differentiated, is used.

However, in the compliance control of the robot, there are provided two cases. One is a case in which the robot acts actively according to the positional command $\theta_{com}$. The other is a case in which the robot acts passively being pushed by an external force.

As shown in FIG. 3, when the actual angular velocity $\omega_{fb}$ (23), which is obtained when the actual motor rotation angle $\theta_{fb}$ (11) is differentiated (24), is used as the angular velocity which is used when the friction torque $\tau\mu$ (20) is calculated by the expression (5) with the calculation block (21), a velocity fluctuation caused by the external force $\tau$dis, which is a portion of the disturbance torque (9) given to the motor, is reflected, so that the calculation accuracy of the friction torque $\tau\mu$ (20) can be enhanced.

However, when the robot is actively operated from a state in which the robot is completely stopped, the operating direction is unknown until the robot starts operating.

Therefore, it is impossible to calculate the stationary friction torque $\tau\mu s$.

Until the robot starts operating, the actual angular velocity $\omega_{FB}$ is 0, and the dynamic friction torque $\tau\mu m$ and the viscous friction torque $\tau\mu d$ calculated by the expressions (6) and (7) are, of course, 0. Therefore, the friction torque $\tau\mu$ calculated by the expression (4) is 0, and no motor torque for operating the robot is generated at all.

In this state, when the torque caused by the electric current command $I_{com}$ (4) of feedback control is suppressed to enhance the compliance and becomes lower than the actual stationary friction torque $\tau\mu s$, the robot is not moved even when the rotation angle command $\theta_{com}$ (1) is generated.

On the other hand, as shown in FIG. 4, when the angular velocity command $\omega_{com}$ (13), which is obtained when the motor rotation angle command $\theta_{com}$ (1) is differentiated, is used for the angular velocity $\omega$ which is used for the calculation (21) of the frictional torque $\tau\mu$ (20), these problems are solved. That is, even when the robot is not operated, when the friction torque $\tau\mu$ (20) is calculated (21) by the expression (4) with the angular velocity command $\omega_{com}$ (13) and added to the feedback electric current command $I_{com}$ (4), the actual friction torque can be compensated. Even when the electric current command $I_{com}$ (4) by feedback control is suppressed, the robot can be operated.

However, when the angular velocity command $\omega_{com}$ (13) is used for the angular velocity $\omega$ which is used for the calculation (21) of the frictional torque $\tau\mu$ (20), the robot can be actively operated according to the angular velocity command $\omega_{com}$ (13). However, in the case where an angular velocity fluctuation is caused by the disturbance torque $\tau$dis in the middle of the operation, a big error is caused between the angular velocity command $\omega_{com}$ (13) and the actual angular velocity $\omega_{fb}$ (reference numeral 23 in FIG. 3). Accordingly, an error of calculation of the viscous friction torque $\tau\mu d$, which is calculated by the expression (7) is increased.

When the robot is pushed by an external force at the time of stoppage of the robot when the angular velocity command $\omega_{com}$ (13) is 0, and the robot is stopped, the frictional torque $\tau\mu$ calculated by the expression (4) is 0 at all times. Therefore, the actual friction torque can not be compensated at all.

Further, even when the robot is not pushed by an external force, a delay of follow is caused in the feedback control conducted by the feedback controller in the actual operation. Therefore, at the time of stoppage of the robot, before the actual angular velocity $\omega_{fb}$ (reference numeral 23 in FIG. 3) becomes 0, the angular velocity command $\omega_{com}$ (13) becomes 0. Therefore, the frictional torque $\tau$ calculated by the expression (4) at this time also becomes 0, and no frictional compensation is made. That is, at the point of time when the angular velocity command $\omega_{com}$ (13) reaches 0, the robot is suddenly stopped and can not reach an objective position and further there is a possibility that vibration is caused.

In this case, in the case where the torque generated by the motor according to the electric current command $I_{com}$ (4) of the feedback control is suppressed to be lower than the actual frictional torque, even when a positional deviation is increased by an external force, the robot is not operated, and it is impossible to reduce the positional deviation.

In other words, although the frictional compensation is being conducted, it is impossible to set the feedback electric current command to be lower than the actual frictional torque. Therefore, the robot compliance can not be enhanced.

As explained above, in the case where the frictional torque $\tau\mu$ is calculated by the expression (4), according to the method in which one of the actual angular velocity $\omega_{fb}$ and the angular velocity command $\omega_{com}$ is used as the angular velocity, even when the electric current $I_{ml}$, which is calculated by the expression (3) with the calculated frictional torque $\tau\mu$, is added to the feedback control electric current, the actual frictional torque can not be compensated.

As shown in FIG. 3, when the frictional torque $\tau\mu$ is compensated by 100% by using the actual angular velocity $\omega_{fb}$ (23) for the angular velocity which is used at the time of calculating (21) the frictional torque $\tau\mu$ (20) with the expression (5), the feedback characteristic of the control system can be subjected to frictional compensation. Therefore, the control system is operated as if there were no friction. Accordingly, although the compliance can be enhanced, the feedback system becomes vibrational.

On the other hand, as shown in FIG. 4, in the case where the angular velocity command $\omega_{com}$ (13) is used for the angular velocity $\omega$ which is used for calculating (21) the frictional torque $\tau\mu$ (20), the feedback characteristic of the control system is not affected. Therefore, in order to improve the target following characteristic, it is desirable that the compensation is made by 100%.

Next, the second conventional example will be explained below.

Concerning the method of finding a collision torque without using a sensor, the following method is commonly used. The motor generation torque is found when a loss of torque, which is generated in the motor and the reduction gear, is subtracted from the torque generated by the drive electric current of the motor. When the torque necessary for the output of the reduction gear, which is found by the dynamic calculation and referred to as a dynamic torque, is subtracted from the motor generation torque found before, the collision torque is found.

For example, the frictional torque corresponding to the loss of the torque generated by the motor is defined as a sum of the proportional item to the velocity (viscous friction torque) and the stationary item (Coulomb's frictional torque), and calculated. This is disclosed, for example, in JP-A-2002-283276.

According to JP-A-6-083403 (U.S. Pat. No. 6,298,283), the following technique is proposed. When the fluctuation of a parameter of the robot is calculated by the estimated algorithm and added to the torque (electric current) command, the fluctuation factor is canceled. In this conventional example, the frictional torque corresponding to a loss caused in the torque generated by the motor is defined as a sum of the proportional item to the velocity and the stationary item, and estimated by the estimation algorithm.

Accordingly, in the case where the collision torque is found without using a sensor when the dynamic torque of the robot is subtracted from the motor generation torque or in the case where the servo following characteristic by the feedforward control of dynamic torque is improved in order to exhibit the motor drive force at the maximum, it is required to accurately calculate the necessary torque by the motor generation torque and the reduction gear output of the robot.

The motor generation torque $\tau$m at the time of operation of the robot can be expressed by the expression (8) when it is viewed from the motor drive side. Further, the motor generation torque $\tau$m at the time of operation of the robot can be expressed by the expression (9) when it is viewed from the load side.

$$\tau mm=K_t*I_m-(J*\alpha+D*\omega+\tau\mu sgn(\omega)) \tag{8}$$

$$\tau ml=\tau dyn+\tau dis \tag{9}$$

In this connection, reference marks shown in the expressions (1) and (2) are defined as follows.

$K_t$: Motor torque constant $I_m$: Motor electric current $\alpha$: Motor angular acceleration $\omega$: Motor angular velocity J: Motor inertia (rotor+primary side of reduction gear)

D: Viscous friction coefficient (converted into motor shaft end)

$\tau\mu$: Frictional torque (converted into motor shaft end)

$\tau$g: Gravity torque (converted into motor shaft end)

$\tau$dyn: Dynamic torque (Dynamic torque is a sum of gravity torque, inertia force, Coriolis force and elastic force, which is converted into a motor shaft end.)

$\tau$dis: Disturbance torque (Disturbance torque is a collision torque or a parameter error. Disturbance torque is converted into a motor shaft end.)

$$sgn(\omega)=\begin{cases}1 & (\omega>0)\\ 0 & (\omega\neq 0)\\ -1 & (\omega<0)\end{cases}$$

Since the motor and the robot arm are connected to each other through the reduction gear, the items in the expression (9) except for the item of the motor inertia J must be converted into the motor shaft end with a reduction ratio.

When it is assumed that $\tau$mm=ml in (8) and (9), the collision torque $\tau$dis can be found by the following deformed the expression (10).

$$\tau dis=K_t*I_m-(J*\alpha+D*\omega+\tau\mu*sgn(\omega)+\tau dyn) \tag{10}$$

In the conventional example, the dynamic friction item $\tau\mu$ in the expression (10) is calculated as a fixed value. However, when the dynamic friction torque item is calculated as a fixed value, in the case where the motor generation torque is high at the time of acceleration and deceleration, a big calculation error of about 10% of the motor generation torque is caused.

On the other hand, feedforward control, the object of which is to improve the servo control characteristic, can be realized as follows. The motor electric current $I_m$ is found by the expression (10) under the condition that the disturbance torque $\tau$ids=0, that is, under the condition that the robot is not contacted with the outside and no parameter errors are caused. The thus found electric current is represented by $I_{ff}$. When $I_{ff}$ is added to the electric current command, the feedforward control can be realized.

$$I_{ff}(J*\alpha+D*\omega+\tau\mu*sgn(\omega)+\tau dyn)/K_t \tag{11}$$

In the conventional example, the calculation of the expression (11) is not used but the dynamic frictional item $\tau\mu$ is estimated by the estimation algorithm. However, it is not a change with age but the frictional torque is greatly changed in a short period of time of acceleration and deceleration. Accordingly, by the estimation of the estimation algorithm, a delay of the phase is generated and it is impossible to completely conduct the compensation.

When the calculation is previously conducted not by the estimation algorithm but by the dynamic torque, the delay of the phase is not caused. However, when the calculation is conducted with the expression (11) while the dynamic frictional torque is set at a fixed value, in the case where the motor generation torque is high at the time of acceleration and deceleration, a big calculation error of about 10% of the motor generation torque is caused.

This error will be explained as follows.

FIG. 11 is a view showing the motor generation torque $\tau mm$ (1), $\tau ml$ (2) and the velocity (3) which are calculated by the expressions (8) and (9) when the robot is made to conduct a reciprocating motion shown in FIG. 12.

In this case, the robot arm to be used is a six axes vertical type multiple joint robot, the portable mass of which is 6 kg and the total arm length of which is approximately 1.3 m. In FIG. 12, the three wrist axes are omitted and the three fundamental axes are shown. At the time of making a measurement, axis FA, which is the third axis, is operated.

In this case, the measurement is made under the condition that the disturbance torque $\tau dis=0$, that is, under the condition that the robot is not contacted with the outside and no parameter errors are caused.

As shown in FIG. 11, in $\tau mm$ (1) and $\tau ml$ (2), the error (4) of about 4% of the peak torque is generated, that is, it can be understood that the expression (8) has an error factor.

When a comparison is made at the time of both the acceleration and the deceleration, the result is as follows.

$$\tau mm > \tau ml$$

In the acceleration and deceleration in the operating section, the angular acceleration and the angular deceleration are the same although the directions are reverse to each other. With respect to the gravity, the robot arm is operated by a symmetrical pattern.

Accordingly, in order to reduce the error by decreasing $\tau dyn$, the dynamic frictional torque $\tau\mu$ must be increased. However, when dynamic frictional torque $\tau\mu$ is increased while it is kept as a constant value, as shown in FIG. 13, although the error (4) at the time of peak torque is decreased, however, the error (5) at the time of a constant velocity is increased.

That is, when the dynamic frictional torque $\tau\mu$ is considered to a constant, the error factor caused by $\tau\mu$ can not be eliminated. Therefore, in the expressions (10) and (11) containing $\tau\mu$, the same error is generated.

Therefore, in the sensorless collision torque detection, when the dynamic frictional torque $\tau\mu$ is considered to a constant, although the robot arm does not collide with an object at the time of acceleration or deceleration, the expression (11) outputs an electric current corresponding to the error as a collision torque. For the above reasons, in order to prevent the occurrence of an erroneous detection, the collision detecting sensitivity must be lowered.

On the other hand, in the case of feedforward control of torque necessary for the reduction gear output, when the dynamic frictional torque $\tau\mu$ is considered to a constant, the calculation error is increased, and there is a possibility that the feedforward compensation torque becomes insufficient. When the estimation algorithm is used so as to prevent the generation of the calculation error, it is difficult to estimate the frictional torque, which is suddenly changed at the time of acceleration or deceleration, without causing a delay of the phase. Accordingly, there is a possibility that the deterioration of the control performance can not be sufficiently prevented.

Next, explanations will be made into a method of stopping the robot arm after the collision detection. There are proposed a method in which the robot arm is returned to the position where the collision is detected (JP-A-2002-117618 (U.S. Pat. No. 6,429,617)), a method in which the velocity command is forcibly set at 0 so as to stop the robot arm (JP-A-2000-52286) and a method in which the robot arm is stopped by the maximum reverse motor torque which is reverse to the rotating direction of the motor (Japanese Patent No. 3212571 (U.S. Pat. No. 6,298,283)) and (Japanese Patent No. 2871993 (U.S. Pat. No. 5,418,440)).

According to the methods in which the robot arm is returned to the collision detecting position, the robot arm is returned to the initial position by the positional control. Therefore, the stopping time depends upon the responding property of the positional control. In general, the responding property of the positional control is several tens Hz at the highest. Therefore, the responding property is not so high at the time of stopping the collision, and the stopping time is extended and it is impossible to prevent the occurrence of damage caused by the collision.

According to the method in which the robot arm is stopped by forcibly setting the velocity command at 0, the stopping time depends upon the responding property of the velocity control. In this case, the responding property is several hundreds Hz, which is higher than the responding property in the case of the positional control. However, it is inferior to the responding property (several kHz) of the electric current control.

According to this method, since the positional control servo rigidity by the integration of the velocity control is high, the robot arm is stopped while the distortion caused by the collision is remaining. Therefore, according to JP-A-2000-052286, the positional control rigidity is softened when the velocity integration gain is made to be 0, so that the problem of the distortion, which is caused by the collision, can be solved. However, in order to enhance the compliance, it is necessary to reduce a gain proportional to the velocity, which deteriorates the velocity responding property and extends the stopping time. It is difficult to make the stopping time and the compliance compatible with each other.

According to the method in which the robot arm is stopped by the maximum reverse motor torque with respect to the rotating direction of the motor, the responding property of the electric current control for generating the reverse torque is so high that the responding property can be several kHz, that is, the responding property is excellent. However, according to the method disclosed in Japanese Patent No. 3212571, it is necessary to previously set the time at which the reverse torque is impressed. When this impressing time is short, it is impossible to sufficiently reduce the velocity, and the damage caused by the collision is increased. When this impressing time is long, a redundant motion is conducted in the reverse direction, and there is a possibility that the robot arm causes the collision again. According to the method disclosed in Japanese Patent No. 2871993, a method is proposed in which the maximum reverse torque is impressed until the motor is stopped. In this method, it is unnecessary to previously determine the impressing time to impress the reverse torque. Therefore, the aforementioned problems are solved. However, only when the motor is stopped, the problem of the distortion caused by the collision can not be solved. Since the generation of the maximum reverse torque itself is a state in which the control is generating the maximum output in an open loop, in the case where the velocity is so low that the robot can not be damaged even when it collides with an object, there is a higher risk of impressing the reverse torque.

In either system, in the axis, the colliding direction of which coincides with the rotating direction of the motor, when the robot arm is returned to the collision detecting position or suddenly stopped, an intensity of the collision force is increased.

FIG. 15 is a view showing this state in which two-axes robot is used for the explanation. In general, the common vertical type multiple joint robot is composed of 6 axes. However, in order to simplify the explanations, 2-axes model will be explained below.

In FIG. 15(*a*), axis UA (41) is operated in the direction of the angular velocity $\omega_{fb}$ (1), and axis FA (42) is operated in the direction of the angular velocity ωfb' (6). When the time passes and each arm operates in the direction shown in FIG. 15(*b*) and collides with an obstacle (43), the collision force (44) is generated, and axis UA (41) is given a force reverse to the rotating direction of the motor, that is, axis UA (41) is given a collision torque τdis (9) in the direction so that the velocity can be reduced. On the other hand, axis FA (42) is given a force in the same direction as the rotating direction of the motor, that is, axis FA (42) is given a collision torque τdis' (10) in a direction so that the velocity can be increased.

After that, in order to return axis FA (42) to the collision detecting position or suddenly stop axis FA (42), it is necessary to generate torque by the motor so that the motor rotation can be reduced. However, this torque is directed reverse to the direction of the collision torque τdis' (10). Therefore, an intensity of the collision torque is increased on the contrary.

According to the method of returning the robot arm to the collision detecting position, although the axis (axis UA in FIG. 15), the motor rotating direction of which is reverse to the colliding direction, is returned to the collision detecting position, the axis (axis FA in FIG. 15), the motor rotating direction of which is the same as that of the colliding direction, is not reversed and continues the operation which has been conducted until the collision. In this way, the aforementioned problems are solved.

However, in the case where the collision is detected without using a sensor, the collision torque is estimated from the pieces of information of the mechanical parameter, position, velocity, acceleration and electric current of the robot. Therefore, compared with the case in which the collision detecting sensor is provided, the detection error is increased. For the above reasons, in the case of an axis, the collision detecting torque of which is low, there is a possibility that the direction is mistakenly detected and the appropriate stopping means can not be selected.

In the case of an axis, the detected collision torque value of which is low, it is safer that the colliding detection is not detected and the motor rotating speed is reduced so as to decrease the kinetic energy. However, since the colliding direction is unknown, it is better not to reduce the motor rotating speed in some cases, that is, different from the method described in Japanese Patent No. 2871993, the reverse torque should not be impressed until the motor is stopped. In the case where the motor rotating speed is so low that the robot can not be damaged even when it collides with an obstacle, the reverse torque should not be impressed.

Further, in the case of a vertical type multiple joint robot, it is impossible to neglect an interference force given between the axes. Accordingly, there is a possibility that a velocity reducing force is given to an axis, the velocity of which should not be reduced, by an interference force given from an axis to which the reverse torque is impressed. In any case, the reverse torque should be impressed upon a necessary axis for a minimum period of time.

DISCLOSURE OF THE INVENTION

The present invention has been accomplished to solve the above problems. It is an object of the present invention to provide a control method, the compliance of which can be enhanced by suppressing the electric current restriction to be lower than the frictional torque by conducting feedback control in the compliance control of a robot driven by a motor.

It is another object of the present invention to provide a control method of controlling a robot capable of highly accurately detecting a collision torque by making a dynamic friction torque of a reduction gear coincide with not a fixed value but a value corresponding to the actual characteristic.

It is still another object of the present invention to provide a control method of controlling a robot capable of enhancing the motor torque calculating accuracy before operation and obtaining the most appropriate feedforward compensation, the delay of the phase of which is small, by making a dynamic friction torque of a reduction gear coincide with not a fixed value but a value corresponding to the actual characteristic.

According to the present invention, a method of controlling a robot is provided which is characterized in that: a rotary angle of a motor to drive a robot is detected; an actually measured value of an angular velocity is calculated from the rotary angle; a frictional torque is calculated by using one of the angular velocity of the command value calculated from the command value given to the motor and the angular velocity of the actually measured value, wherein the angular velocity having a higher absolute value is used in this calculation; and when the motor is driven according to the above command value, a value corresponding to the frictional torque is added to the command value given to the motor. Due to this method, an electric current restriction by feedback control can be suppressed to be lower than the frictional torque. Therefore, it is possible to realize a control method, the compliance of which is high.

When one of the command value and the actually measured value is appropriately selected as an angular velocity used for the frictional torque calculation and the frictional compensation rate is changed at the same time, the feedback characteristic can be prevented from being vibrational and further the target following characteristic can be improved.

The present invention provides a method of controlling a robot driven by a motor via a reduction gear characterized in that: when an external force is calculated by subtracting a necessary torque of the reduction gear output found by the dynamic calculation of the robot from a torque generated by the motor, a dynamic frictional torque of the reduction gear is calculated being increased corresponding to the necessary torque of the reduction gear output.

The present invention provides a method of controlling a robot driven by a motor via a reduction gear characterized in that: according to the inverse dynamic calculation of the robot to find a necessary torque of the reduction gear output and also according to the dynamic frictional torque calculation of the reduction gear, the motor output torque compensation is made by feedforward control; and when the feedback control is conducted, the dynamic frictional torque of the reduction gear is calculated being increased proportional to the necessary torque of the reduction gear output.

According to the present invention, in the case of an axis, the collision torque direction of which is reverse to the rotating direction of the motor after the detection of collision, when the robot control mode is switched from the positional control to generate an electric command for making an actual position follow a positional command to the current control to command an electric current to generate a torque, the direction of which is reverse to the motor rotating direction, by the motor, the motor rotating speed is reduced and the collision energy is alleviated. After that, when the motor velocity is decreased to a value lower than the setting value, the control mode is switched to the compliance control so that the robot arm can follow the collision force direction, and the problem of distortion caused in the reduction gear by the collision is solved. It is possible to stop and decrease the velocity by the electric current control, the responding property of which is the highest, and further when the motor velocity is monitored, the motor torque impressing time, the direction of which is reverse to the motor rotating direction, can be determined. Therefore, it is unnecessary to previously set the motor torque impressing time.

On the other hand, in the case of an axis, the direction of the collision torque of which is the same as the motor rotating direction, without conducting the electric current control, the control mode is directly switched from the positional control to the compliance control. When the axis is operated while following the collision force, the collision torque can be alleviated.

In the case of an axis, the motor rotating speed at the time of collision of which is lower than the setting value, irrespective of the motor rotating direction and the collision torque direction, the control mode is directly switched from the positional control to the compliance control without conducting the electric current control. Therefore, an open loop state of only the electric current control is not generated when it is unnecessary.

BRIEF DESCRIPTION OF THE DRAWINGS

FIG. 8 is a view showing a parameter in a dynamic frictional torque approximate expression.

FIG. 16 is a block diagram showing a collision stopping control device (position control mode) in the first embodiment.

FIG. 17 is a block diagram showing a collision stopping control device (electric current control mode) in the first embodiment.

FIG. 18 is a block diagram showing a collision stopping control device (compliance control mode) in the first embodiment.

FIG. 21 is a block diagram showing a collision stopping control device (electric current control mode) in the fourth embodiment.

FIG. 24 is a block diagram showing a collision stopping control device (compliance control mode) in the third embodiment.

BEST MODE FOR CARRYING OUT THE INVENTION

Figure 1:
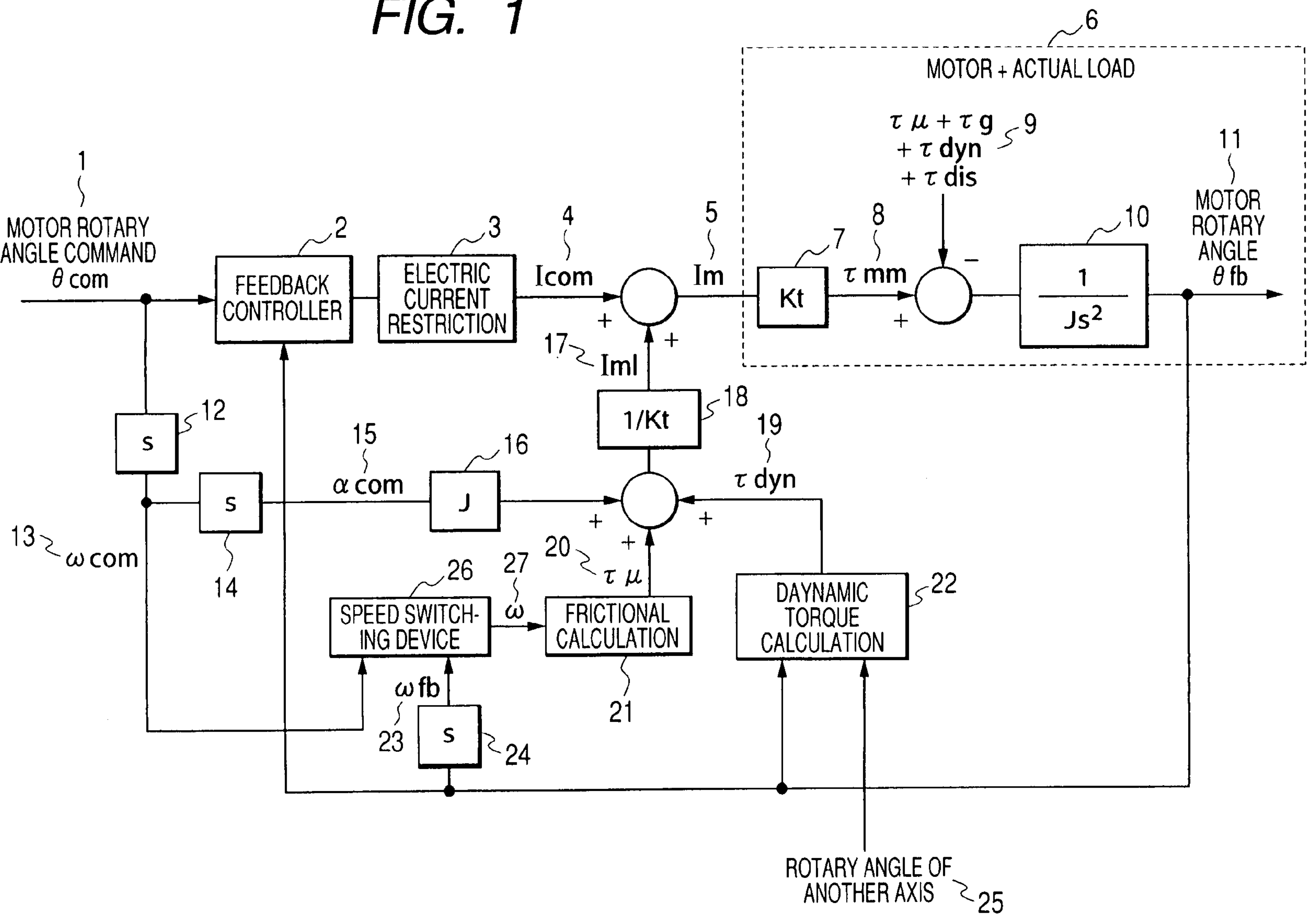
FIG. 1 is a block diagram showing a control method of controlling a frictional compensation in the first and the second embodiment.

Referring to the drawings, the most preferred embodiment of the robot controlling method of the present invention will be explained as follows.

First Embodiment

FIG. 1 is a block diagram showing the controlling method of the present invention. In FIG. 1, reference numeral 26 is a velocity switching device, and reference numeral 27 is an angular velocity ω selected by the velocity switching device. The feedback electric current command $I_{com}$ (4) can be found in such a manner that PID calculation is conducted by the feedback controller (2) from the rotary angle command $\theta_{com}$ (1) and the actual motor rotary angle $\theta_{fb}$ and that the electric current restriction (3) is conducted. Concerning the means for the electric current restriction (3), there are provided a system in which the limit is set and a system in which the feedback gain is lowered.

On the other hand, $I_{ml}$ (17) can be calculated by the expression (3) as follows. The angular acceleration $\alpha_{com}$ (15), which is found when the motor rotation command $\theta_{com}$ (1) is subjected to the differential calculations (12), (14) twice, is multiplied by the motor inertia J (16). The frictional torque τμ (20) and the dynamic torque τdyn (19) are added to the thus obtained value. The thus obtained value is multiplied by the inverse number $1/K_t$ (18) of the motor torque constant. In this way, $I_{ml}$ (17) can be calculated.

The velocity switching device (26) selects either the angular velocity command $\omega_{com}$ (13), which is obtained when the motor rotation angle command $\theta_{com}$ (1) is differentiated (12), or the actual angular velocity $\omega_{fb}$ (23), which is obtained when the actual motor rotation angle $\theta_{fb}$ (11) is differentiated (24), for the angular velocity ω (27) used when the frictional torque τμ (20) is calculated (21) by the expressions (5) to (9).

Velocity is switched by the velocity switching device (26) by the following expressions.

$$\omega = \begin{cases} \omega fb & (|\omega com| \le |\omega fb|) \\ \omega com & (|\omega com| > |\omega fb|) \end{cases} \tag{12}$$

In the expression (12), the absolute value of the angular velocity command $\omega_{com}$ (13) and the absolute value of the actual angular velocity $\omega_{fb}$ (23) are compared with each other, and the higher value is selected as ω (27).

The frictional torque τμ (20) is calculated by the expressions (5) to (7) with this ω (27).

When the selection is made as described above, even when the compliance control becomes valid, the frictional torque τμ (20) can be appropriately calculated without being reduced to 0 either in the case where the positional command $\theta_{com}$ (1) is inputted and the robot arm is actively operated or in the case where the robot arm is pushed by the external force τdis and passively operated.

Even when the robot is pushed by the external force τdis and the positional deviation is increased while the robot is being actively operated and a difference is made between the angular velocity command $\omega_{com}$ (13) and the actual angular velocity $\omega_{fb}$ (23), if the absolute value of the actual angular velocity $\omega_{fb}$ (23) becomes higher than the absolute value of the angular velocity command $\omega_{com}$ (13), the actual angular velocity $\omega_{fb}$ (23) is adopted for ω (27). Therefore, the factor of causing the error can be reduced in the calculation of the frictional torque τμ (20).

Further, at the time of stopping operation, even when the angular velocity command $\omega_{com}$ (13) becomes 0 before the actual angular velocity $\omega_{fb}$ (23) becomes 0, if the absolute value of the actual angular velocity $\omega_{fb}$ (23) becomes higher than the absolute value of the angular velocity command $\omega_{com}$ (13), $\omega_{fb}$ (23) is adopted for ω (27). Therefore, the frictional compensation by the frictional torque τ calculated by the expression (4) can be continued from this point of time. That is, it is possible to prevent the occurrence of a sudden stoppage caused by the elimination of the frictional compensation at the point of time when the angular velocity command $\omega_{com}$ (13) has reached 0. Accordingly, it is possible to prevent such a problem that the robot arm can not reach a target position or vibration is generated in the robot arm.

Due to the above constitution, even when the restriction of the electric current $I_{com}$ (4) by feedback control is suppressed to be lower than the actual frictional torque so as to enhance the compliance of control, it is possible to prevent the occurrence of such a problem that the robot arm can not reach a target position or the robot arm is increasingly vibrated when it is stopped.

Second Embodiment

In the expression (12) showing a switch of velocity in the first embodiment, at least one of the velocity command value and the actually measured value is multiplied by a weighting factor.

$$\omega = \begin{cases} \omega fb & (|kc1 * \omega com + kc2| \le |\omega fb|) \\ \omega com & (|kc1 * \omega com + kc2| > |\omega fb|) \end{cases} \tag{13}$$

When the constitution is made as shown by the expression (13), priority is given to one of the velocity command value and the actually measured value so that it can be adopted as a velocity.

Since the actually measured value $\omega_{fb}$ includes a measurement error, for example, when the weighting factor in the expression (13) is set at a value as follows, the velocity command $\omega_{com}$ can be preferentially selected.

$$kc1>1 \text{ and } kc2>0 \tag{14}$$

Third Embodiment

Figure 2:
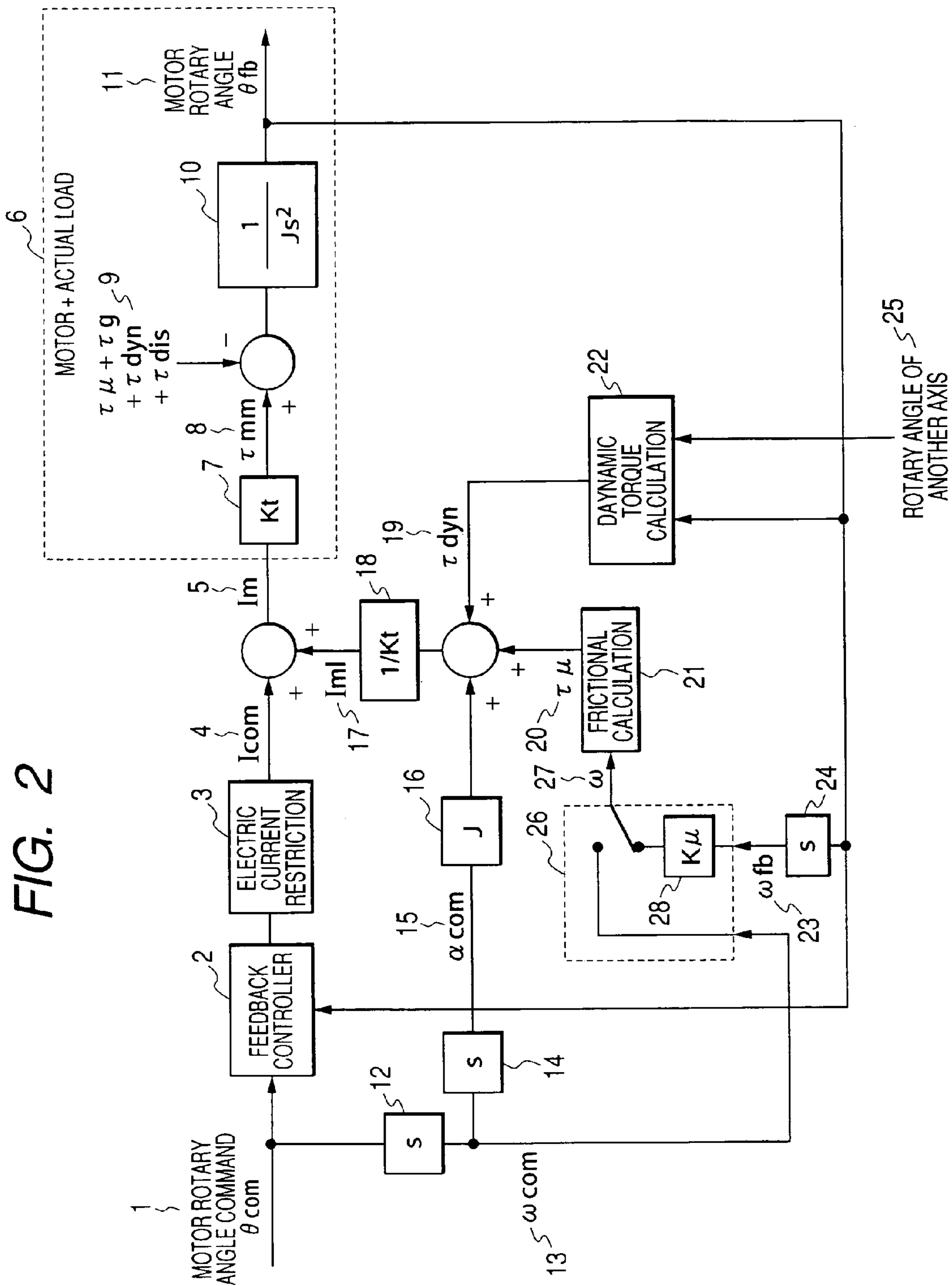
FIG. 2 is a block diagram showing a control method of controlling a frictional compensation in the third embodiment.
Figure 3:
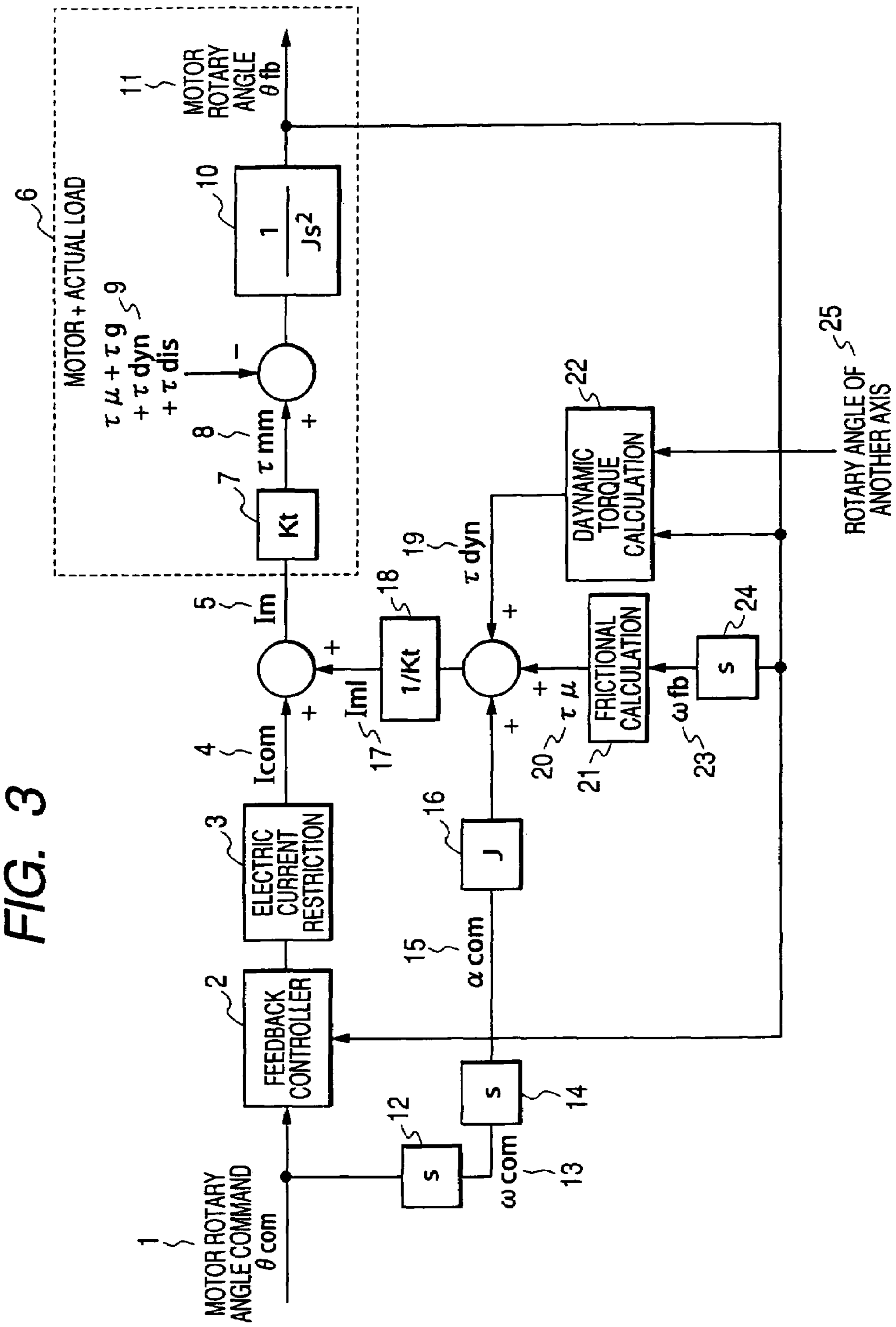
FIG. 3 is a block diagram showing a control method of controlling a frictional compensation, in which an actual velocity is used, in the conventional example.
Figure 4:
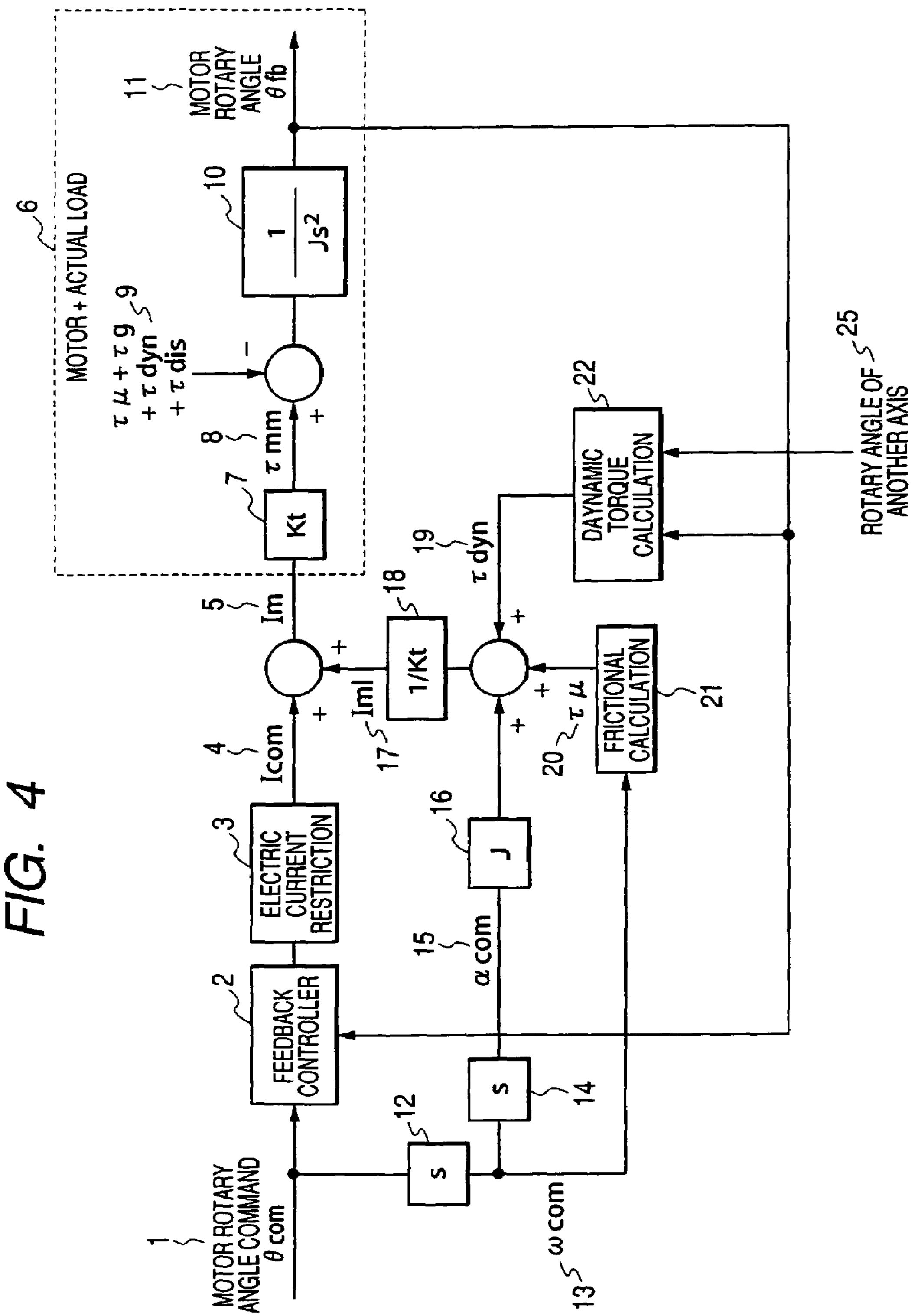
FIG. 4 is a block diagram showing a control method of controlling a frictional compensation, in which a velocity command is used, in the conventional example.

FIG. 2 is a block diagram showing a control method of the third embodiment.

The actual angular velocity $\omega_{fb}$ (23) inputted into the velocity switching device (26) is multiplied by the frictional compensation rate kμ.

It is expressed by the expression (15) as follows.

$$\omega = \begin{cases} k\mu * \omega fb & (|kc1 * \omega com + kc2| \le |\omega fb|) \\ \omega com & (|kc1 * \omega com + kc2| > |\omega fb|) \end{cases} \tag{15}$$

kμ: Frictional compensation rate

When the angular velocity ω (27) obtained by the above expression (15) is used, in the case where the actual angular velocity ωFB (23) is selected for the angular velocity used when the frictional torque τμ (20) is calculated (21) by the expression (5), when the frictional compensation rate kμ is set at a value not more than 1, the frictional torque τμ (20) can not be compensated by 100%. Therefore, it is possible to adjust so that the feedback characteristic can not be vibrational.

On the other hand, in the case where the angular velocity command $\omega_{com}$ (13) is used for the angular velocity ω which is used for the calculation (21) of the frictional torque τμ (20), the frictional torque τμ (20) can be compensated by 100% without affecting the feedback characteristic of the control system. Therefore, the target following characteristic can be improved.

Fourth Embodiment

Figure 6:
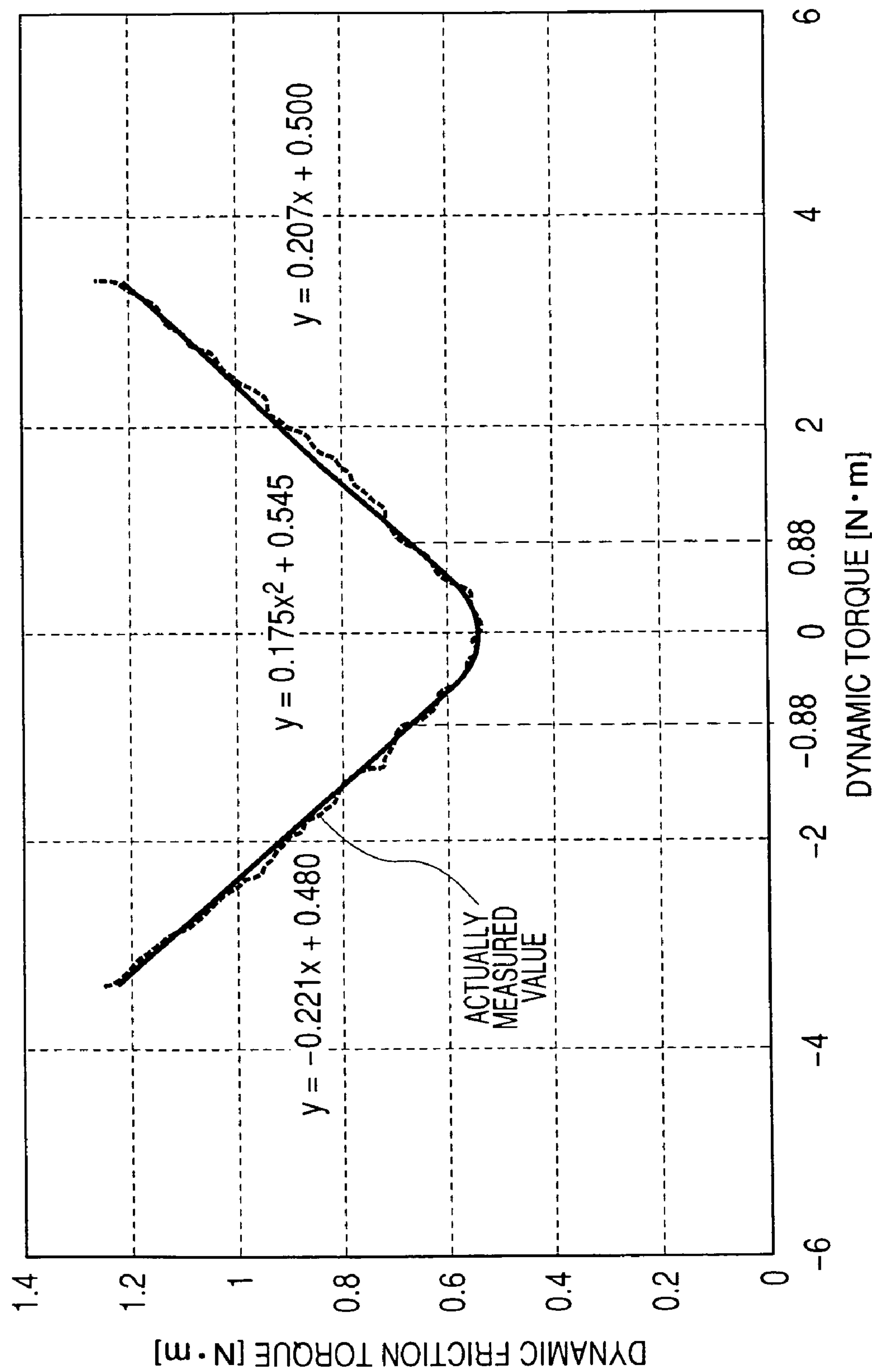
FIG. 6 is a view showing an example of the dynamic frictional torque characteristic necessary for the reduction gear output of a harmonic reduction gear.
Figure 7:
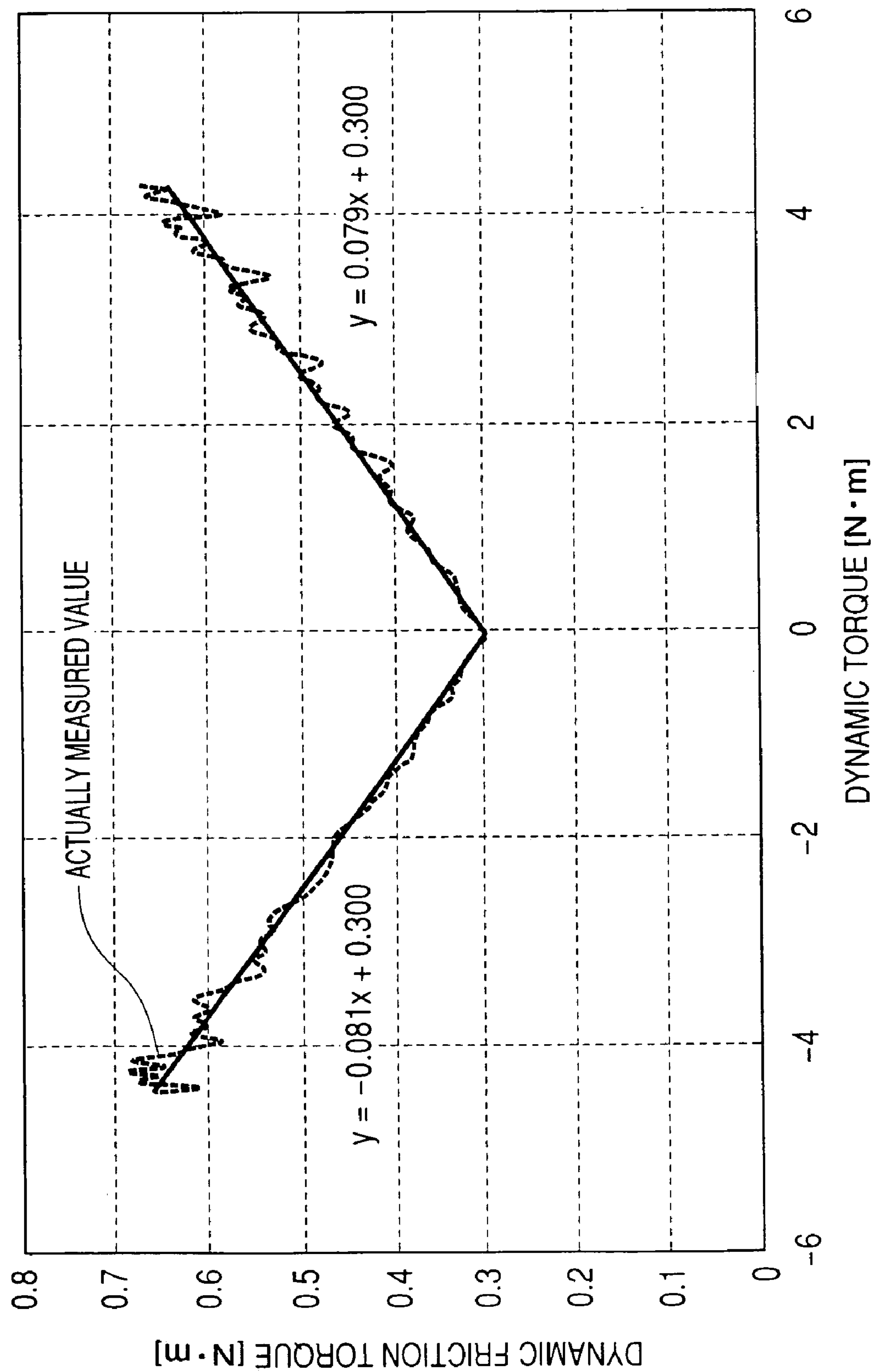
FIG. 7 is a view showing an example of the dynamic frictional torque characteristic necessary for the reduction gear output of RV reduction gear.

FIGS. 6 and 7 are views showing a result of measurement in which the dynamic frictional torque in the typical reduction gear used for a robot is measured with respect to the fluctuation of the dynamic torque τdyn under the condition that the disturbance torque τdis=0. FIG. 6 is a view showing a characteristic in the case of a harmonic reduction gear, and FIG. 7 is a view showing a characteristic in the case of RV reduction gear which is a type of the eccentric differential reduction gear.

As can seen from FIGS. 6 and 7, according to an increase in the dynamic torque τdyn, the dynamic frictional torque is increased. The dynamic frictional torque can be approximated by the expression (16).

$$\tau\mu a = \begin{cases} A*\tau dyn + B & (\tau dyn \geq \tau th) \\ C*\tau dyn^2 + D & (|\tau dyn| < \tau th) \\ E*\tau dyn + F & (\tau dyn \leq -\tau th) \end{cases} \quad (16)$$

In the expression (16), reference characters A, B, C, D, E and F are approximate constants, and τth is a setting threshold value.

The above parameters shown in FIGS. 6 and 7 are described in FIG. 8.

Figure 9:
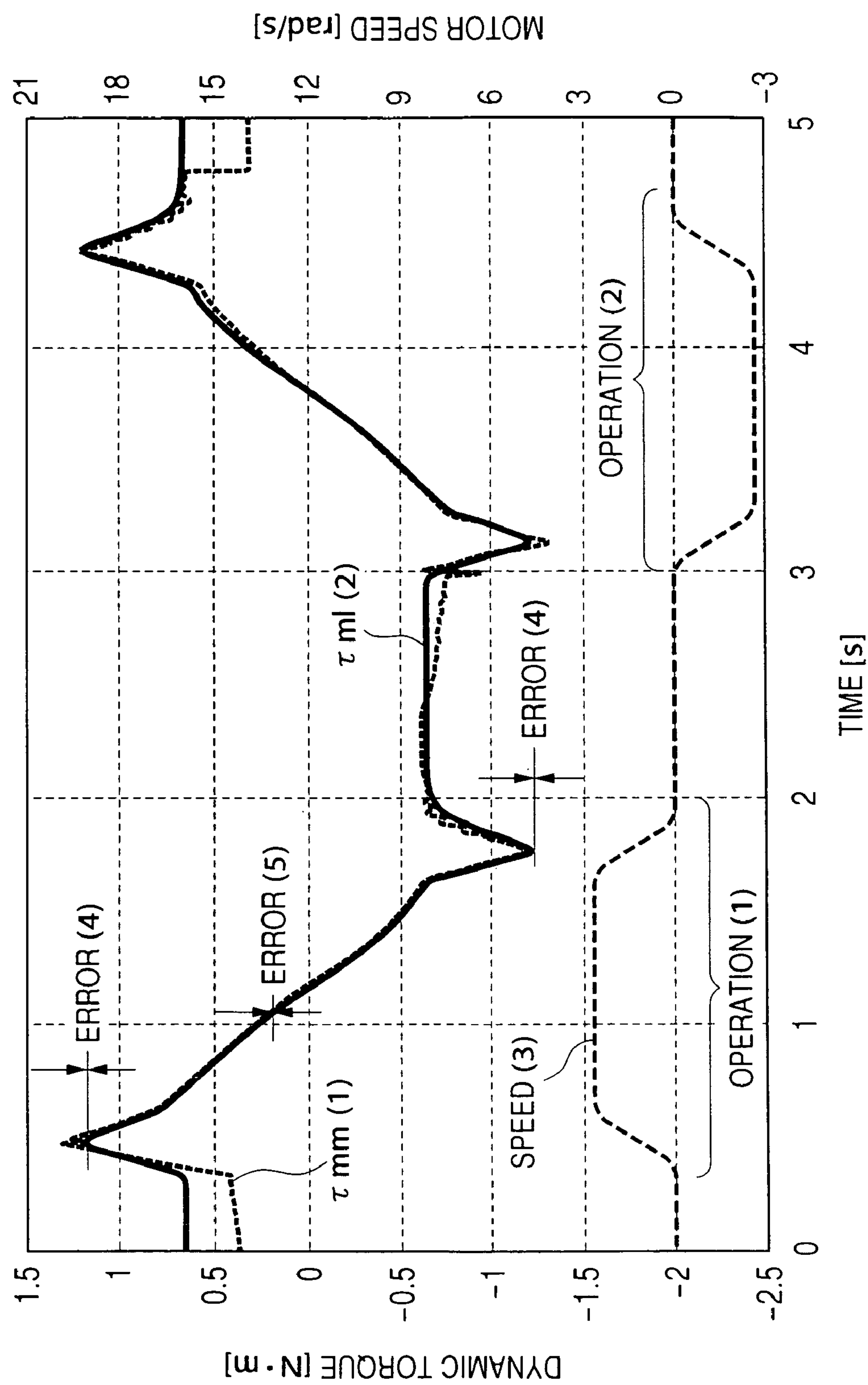
FIG. 9 is a view showing a torque error necessary for the reduction gear output according to the dynamic frictional torque calculation method of the present invention.
Figure 11:
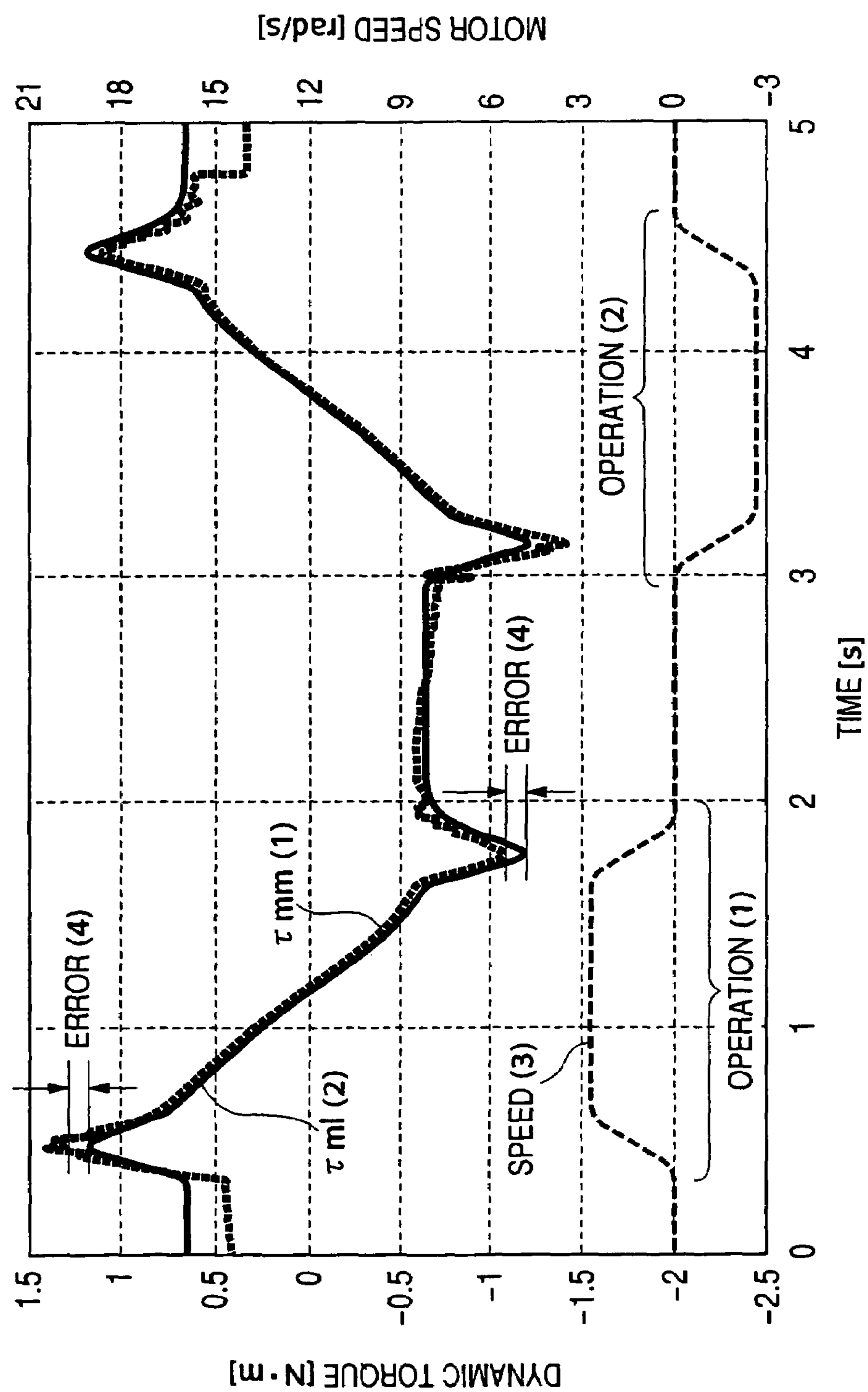
FIG. 11 is a view showing a torque error necessary for the reduction gear output according to the dynamic frictional torque calculation method of the conventional example.
Figure 12:
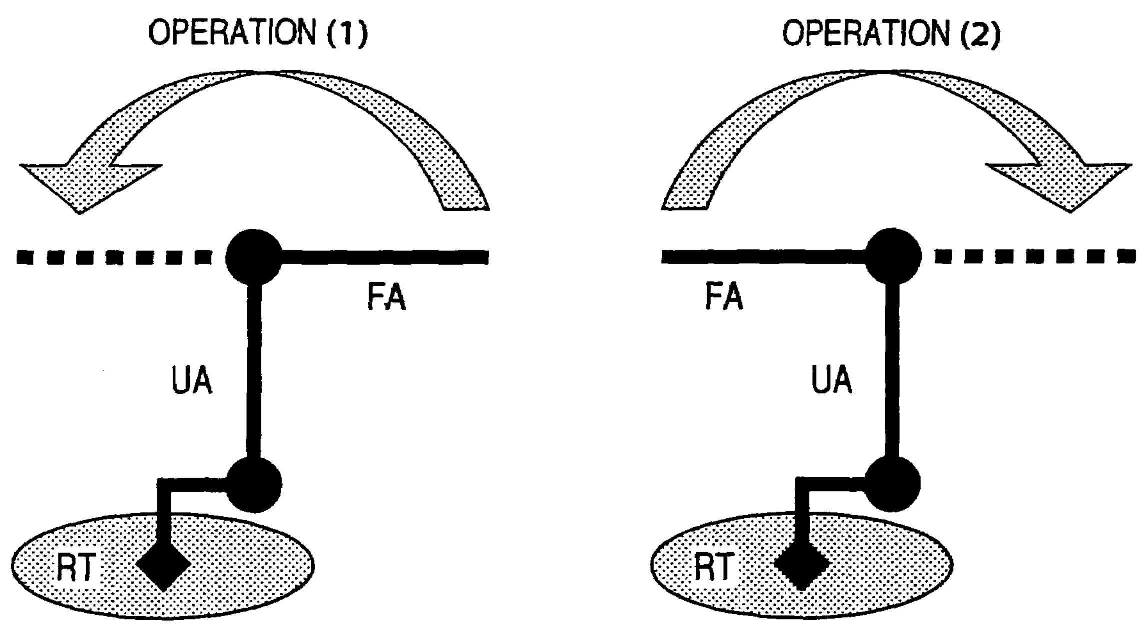
FIG. 12 is a view showing operation at the time of measuring torque necessary for the reduction gear output.
Figure 13:
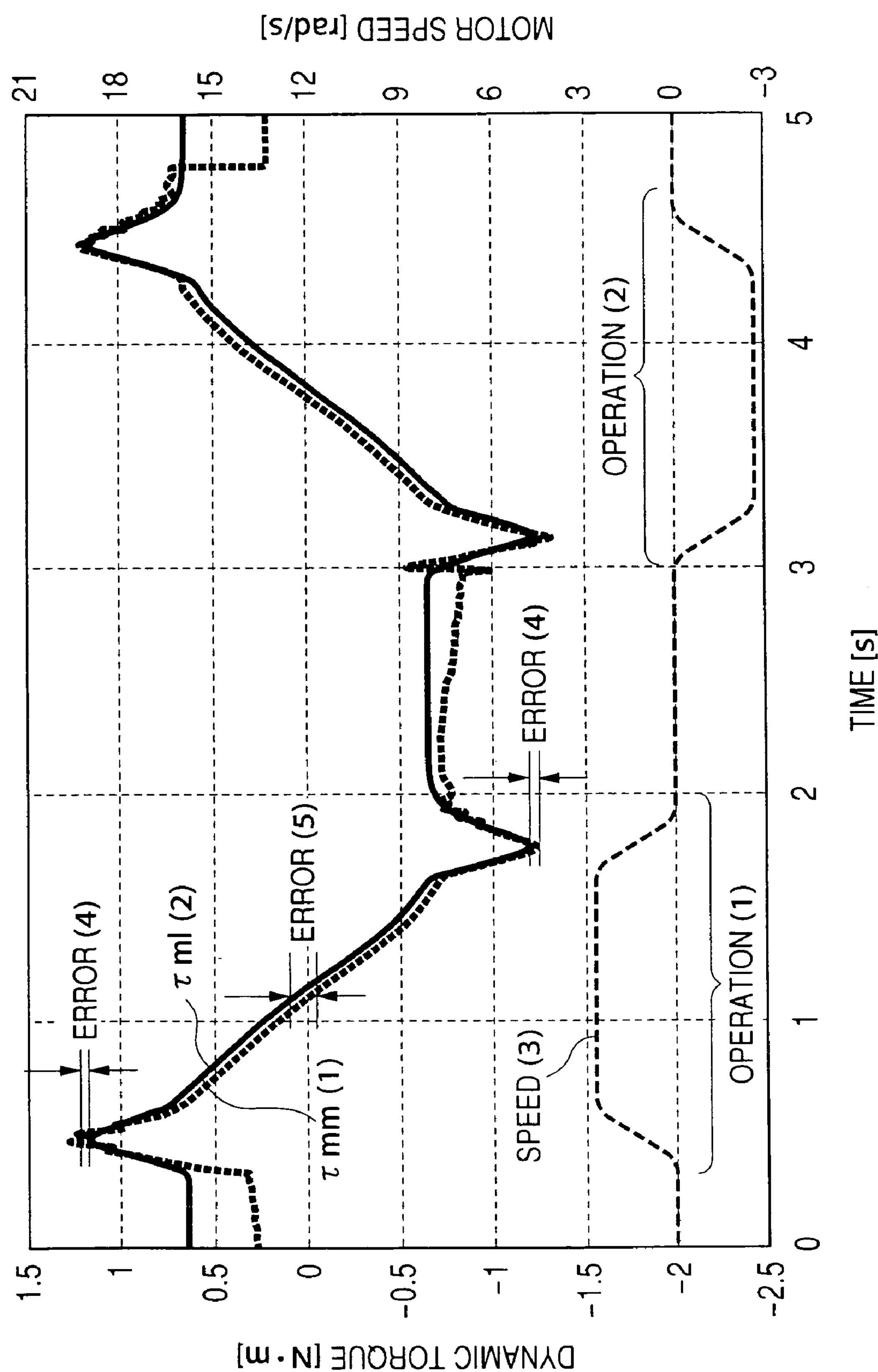
FIG. 13 is a view showing a torque error necessary for the reduction gear output in the case where the dynamic frictional torque is increased.

FIG. 9 is a view showing a result of calculation in which the dynamic frictional torque approximate value τμa is calculated according to the expression (16) and the necessary torque is calculated and compared at the same reduction gear output as the reduction gear output shown in FIG. 11. As can be seen in FIG. 9, compared with FIG. 11, the error (5) at a constant velocity is not increased and the error (3) at a peak torque is decreased.

Then, when the expression (10) is deformed with τμa which has been calculated by the expression (16), the following expression can be obtained.

$$\tau disa = K_t * I_m - (J*\alpha + D*\omega + \tau\mu a*sgn(\omega) + \tau dyn) \quad (17)$$

When the collision torque τdisa is calculated by this expression (17), it becomes possible to reduce an error especially before the collision compared with the expression (10). Therefore, it is unnecessary to lower the collision detecting sensitivity, and the collision detecting accuracy can be enhanced.

Figure 5:
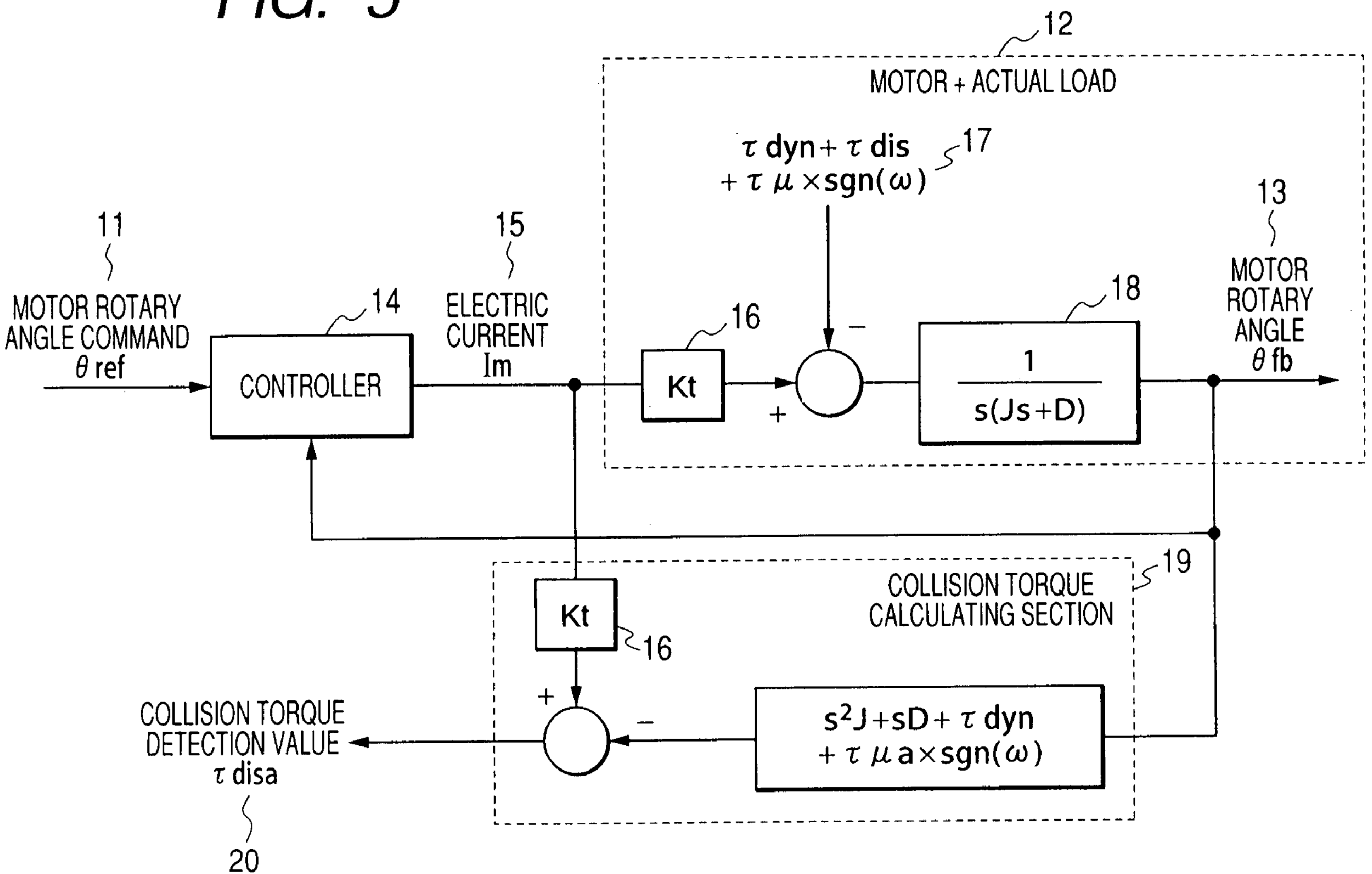
FIG. 5 is a block diagram showing a collision torque detecting method of Embodiment 1 of the present invention.

FIG. 5 is a block diagram showing this method.

In FIG. 5, the motor rotary angle command value $\theta_{ref}$ (11) and the motor rotary angle $\theta_M$ (13), which is obtained from the region (12) enclosed by the dotted line showing (motor)+(actual load), are compared with each other, and the controller (14) supplies the electric current $I_m$ (15) to the motor. In the motor, torque is generated which is obtained when the electric current $I_m$ (15) is multiplied by the torque constant $K_t$ (16). The sum (17) of the dynamic torque τyn, the collision torque τdis and the frictional torque τμ×sgn(ω) is subtracted from this torque. The torque thus obtained from the subtraction is used for driving the single motor body expressed by the block (18). The collision torque calculating section (19) calculates the collision torque detecting value τdisa (20) from the motor rotary angle $\theta_M$ (13) and the electric current $I_m$ (15) by the expression (17).

In this connection, although the error is increased, the motor electric current torque $\tau mO = K_t \times I_m$ may be used instead of the dynamic torque τdyn in the expression (17).

Fifth Embodiment

Next, the fifth embodiment of the present invention will be explained below.

First, concerning the dynamic frictional torque, the expression (16) is used. When the expression (11) is deformed, the following expression (18) can be obtained.

$$I_{ff}(J*\alpha + D*\omega + \tau\mu a*sgn(\omega) + \sigma dyn)/K_t \quad (18)$$

In this expression (18), when the angular velocity ω and the angular acceleration α are calculated by conducting the differentiation on the motor rotary angle command $\theta_{ref}$, the expression (18) can be deformed into the expression (19). Therefore, the electric current $I_{ff}$ to generate the torque necessary for the motor can be calculated without using a feedback signal.

$$I_{ff}(J*s^2(\theta_{ref}) + D*s(\theta_{ref}) + \tau\mu a*sgn(\omega) + \tau dyn)/K_t \quad (19)$$

Figure 10:
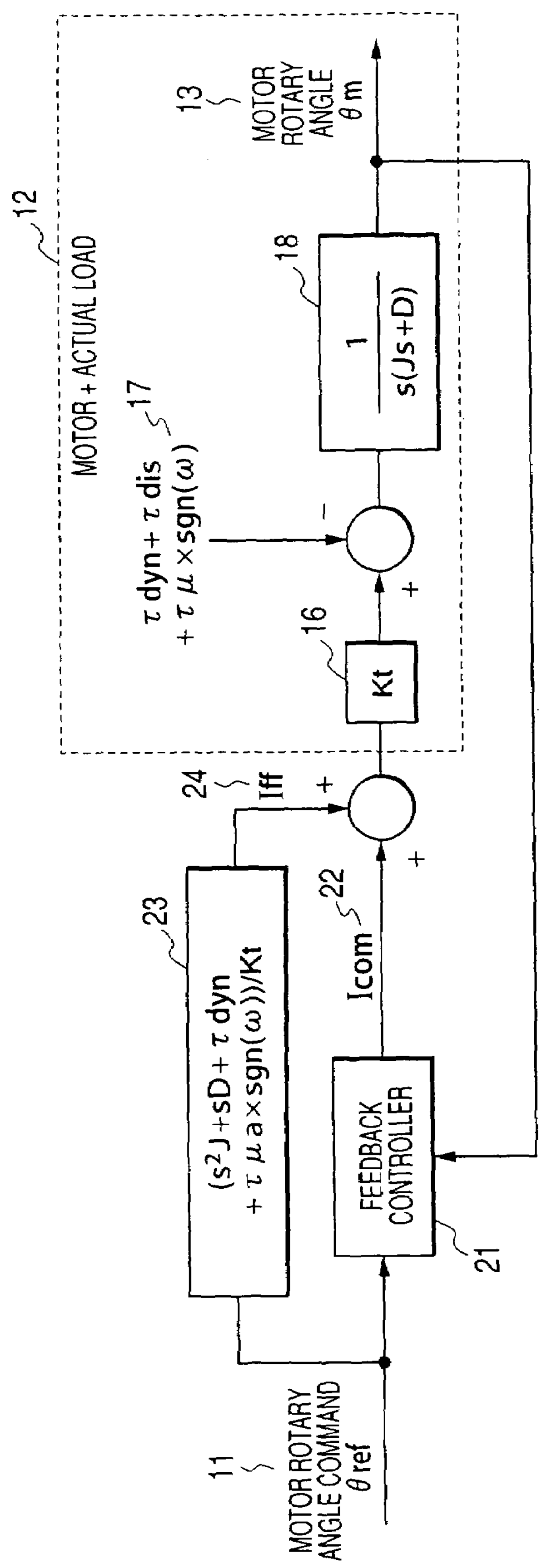
FIG. 10 is a block diagram of the torque feedforward control necessary for the reduction gear output in Embodiment 2 of the present invention.

FIG. 10 is a block diagram showing an embodiment in the case where the feedforward compensation is made by this feedforward electric current $I_{ff}$.

In FIG. 5, the motor rotary angle command value $O_{ref}$ (11) and the motor rotary angle $\theta_M$ (13), which is obtained from the region (12) enclosed by the dotted line showing (motor)+(actual load), are compared with each other, and the feedback control (21) outputs the electric current command $I_{com}$ (22) which is made to flow in the motor. When the feedforward electric current command $I_{ff}$ (24) obtained by the block (23) showing the expression (9) is added to the electric current command $I_{com}$ (22) obtained by this feedback control, it is possible to realize the feedforward control in which the error and the delay of estimation are small.

Seventh Embodiment

FIG. 16 is a view showing the seventh embodiment of the present invention.

In FIG. 16, item (26) is a collision torque detecting means for detecting the collision torque τdisd (27) which is given to the motor for driving the arm by the collision force given to the robot arm, item (25) is a collision judging means for judging a collision by comparing the collision torque detecting value τdisd (27) with the collision torque threshold value, which has been set, and for outputting the collision detecting signal $D_{co1}$ (30), reference numeral (24) is a motor rotation detecting means (23) for detecting the angular velocity $\omega_{fb}$ of the motor from the motor rotation angle $\theta_{fb}$ (22), reference numeral (23) is a collision direction judging means for outputting the collision direction flag $D_{ir}$ (31) by comparing the collision torque detecting direction with the motor rotating direction, reference numeral (32) is a motor deceleration judging means for outputting the motor deceleration judging signal $D_{th}$ (33) by comparing the motor angular velocity $\omega_{fb}$ (1) with the threshold value, which has been set, and by confirming the deceleration of the motor, and reference numeral (15) is a control mode switching means which will be described as follows. In the case of an axis in which the motor rotating direction and the collision torque direction are opposite to each other, when the position control means (12) for generating an electric current command to make the motor rotary angle $\theta_{fb}$ follow the rotary angle command $\theta_{com}$ (11) is switched to the electric current control means (13) for giving a command to generate an electric current so that the torque, the direction of which is opposite to the direction of the motor rotation, can be generated by the motor, the motor rotation velocity is reduced. When the motor rotation velocity is reduced to a value not more than the setting value, the control mode switching means switches the mode to the compliance control means (14) which follows the direction of the colliding force. In the case of an axis in which the motor rotating direction is the same as the collision torque direction, the control mode switching means switches the mode from the position control means (12) to the compliance control means (14).

Next, referring to FIG. 16, the stoppage control method conducted after the detection of collision will be explained in detail as follows. The electric current command $I_{com1}$ (2) for conducting position control is found by the feedback controller (12), which is a position control means, from the motor rotating angle command $\theta_{com}$ (11) and the actual motor rotating angle $\theta_{fb}$ (22). The feedback controller (12) is usually composed of PID control.

In the usual positional control conducted before the detection of collision, the electric current command $I_{com1}$ (2) is selected as the motor current $I_m$ (16) by the control mode switching block (15) and impressed upon (motor)+(actual load) (17).

The motor torque $\tau_{mm}$ (19), which is obtained when the motor electric current $I_m$ (16) is multiplied by the torque constant $K_t$ (18), and the disturbance torque (20) are impressed upon the transfer function (21) described with the motor inertia J.

The disturbance torque (20) is a sum of the frictional torque τμ, the gravity torque τg, the dynamic torque τdyn (the sum of the inertia force, the centrifugal force and Coriolis force) and the collision torque τdis.

The motor rotary angle $\theta_{fb}$ (22) is outputted from the motor transfer function (21) and usually detected by an optical type encoder or a magnetic type encoder.

In the collision torque detecting block (26), the collision torque detecting value τdisd (27) is found as follows. By using this motor rotary angle (22), the other axis motor rotary angle (29), the angular velocity capable of being led out by conducting time differentiation on them, the angular acceleration and the robot machine parameter, under the condition that the collision torque τdis is not generated, the torque necessary for the motor is found by the inverse dynamic calculation. A value obtained when the actual motor electric current $I_{mm}$ (16) is multiplied by the torque constant $K_t$ (18) is subtracted from the thus obtained value. In this way, the collision torque detecting value τdisd (27) can be found.

The collision judging block (25) judges that a collision has been caused when one of the collision torque detecting value τdisd (27) and the collision torque detecting value (28), which has been found in the other axis in the same manner, has exceeded the predetermined collision detecting threshold value $\tau_{cth}$. Then, the collision detecting signal $D_{co1}$ (30) is sent to the control mode switching block (15).

In the motor angular velocity detecting block (24), the motor rotary angle $\theta_{fb}$ (22) is differentiated so as to find the motor angular velocity $\omega_{fb}$ (1). The collision direction judging block (23) calculates the collision direction flag $D_{ir}$ (31) from the motor angular velocity $\omega_{fb}$ (1) and the collision torque detecting value τdisd (27) by the following expression.

$$Dir = \begin{cases} 1 & (\omega fb * \tau disd < 0) \\ 0 & (\omega fb * \tau disd \geq 0) \end{cases} \quad (20)$$

In the expression (20), when the direction of the motor angular velocity $\omega_{fb}$ (1) and the direction of the collision torque detecting value τdisd (27) are opposite to each other, the collision direction flag $D_{ir}$ (31) becomes 1. In the other case except for that, the collision direction flag $D_{ir}$ (31) becomes 0.

Figure 15:
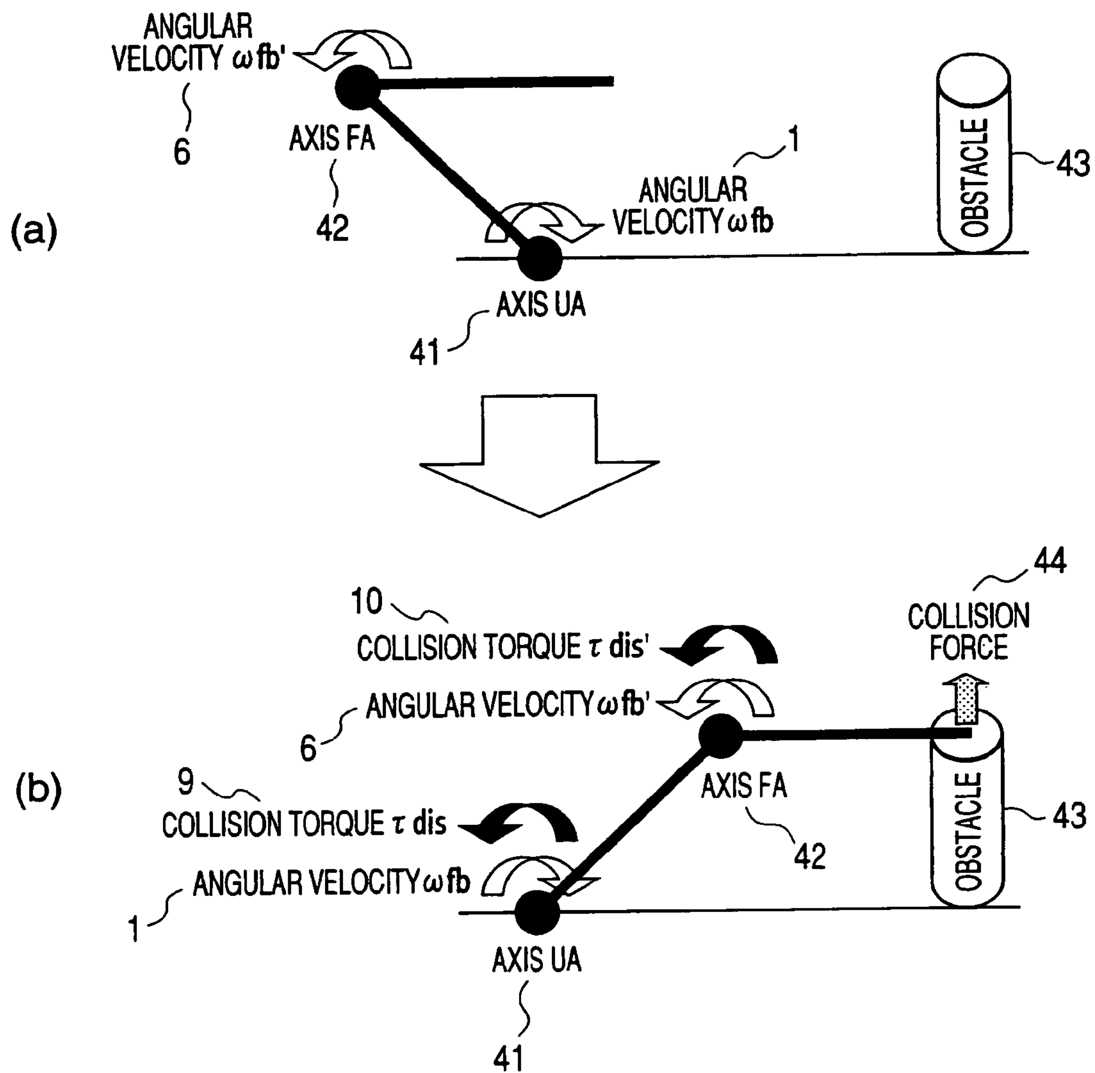
FIG. 15 is a robot operation drawing showing a velocity direction and a collision torque direction at the time of collision.

In the operation shown in FIG. 15, in axis UA (41), $D_{ir}$=1, and in axis FA (42), $D_{ir}$=0.

At the point of time when the collision detecting signal $D_{co1}$ (30) is inputted, the control mode switching block (15) switches the control mode according to the information of the collision direction flag $D_{ir}$ (31).

$$Im = \begin{cases} Icom2 & (Dir = 1) \text{ Current Control Mode} \\ Icom3 & (Dir = 0) \text{ Compliance Control Mode} \end{cases} \quad (21)$$

Since $D_{ir}$=1 in axis UA, the electric current $I_{com2}$ (3) for generating the torque, the direction of which is opposite to the motor rotating direction, is generated from the motor angular velocity $\omega_{fb}$ (1) by the electric current control block (13). Then, as shown in FIG. 17, the control mode switching block (15) selects $I_{com2}$ (3) as the motor electric current $I_m$ (16), that is, the mode is shifted to the electric current control mode.

According to the above constitution, since axis UA (41) is suddenly decelerated, the collision torque τdis (9) after the collision detection can be reduced.

When axis UA (41) is decelerated and the absolute value of the angular velocity $\omega_{fb}$ (1) becomes lower than the predetermined deceleration judging threshold value $\omega_{fb}$ (5), the motor deceleration judging block (32) outputs the motor deceleration judging signal $D_{th}$ (33).

$$D_{th}=1 \ (|\omega_{fb}|<\omega_{th}) \quad (22)$$

When this motor deceleration judging signal $D_{th}$ (33) is outputted, the control mode switching block (15) selects $I_{com3}$ (4) as the motor electric current $I_m$ (6), and the mode is shifted to the compliance control mode shown in FIG. 18.

In this connection, in the case where the absolute value of the angular velocity of $\omega_{fb}$ (1) is lower than the predetermined threshold value $\omega_{th}$ (5) and the condition of the expression (22) is satisfied at the time of collision detection, the mode is not shifted from the usual control mode (shown in FIG. 16) to the electric current control mode (shown in FIG. 17) but the mode is shifted to the compliance control mode (shown in FIG. 18) without conducting deceleration by impressing the reverse torque upon the motor.

In this case, the compliance control can be realized in such a manner that the compliance control block (14) makes a restriction of the electric current which is commanded by the electric current command $I_{com1}$ (2) outputted from the feedback controller (12) and then adds a gravity compensation electric current so as to prevent the robot from dropping down by its own weight.

Due to the foregoing, even when the deviation between the motor rotary angle command $\theta_{com}$ (11) and the motor rotary angle $\theta_{fb}$ (22) is increased, since the motor electric current is restricted, the servo rigidity of the positional control is reduced so that the compliance of control can be enhanced.

Concerning the restriction of the electric current, it is possible to realize the restriction of the electric current by decreasing a gain in the feedback controller (12).

When the motor deceleration judging signal $D_{th}$=1 in the expression (22), the motor angular velocity $\omega_{fb}$ (1) is lower than the threshold value $\omega_{thr}$, that is, the motor is almost stopped and the inertial energy is low. Therefore, when the mode is shifted to the compliance mode, the problem of distortion in the reduction gear generated at the time of collision can be solved.

On the other hand, in the case of axis FA (42), the collision direction flag $D_{ir}$=0 in the expression (2). Therefore, when axis FA (42) is suddenly accelerated or decelerated in the same manner as that of axis UA (41), the collision torque $\tau_{dis'}$ (10) is increased on the contrary.

Therefore, in the case where the collision direction flag $D_{ir}$=0 at the time of the occurrence of collision, the control mode switching block (15) switches the control mode from the usual control mode (shown in FIG. 16) to the compliance control mode (shown in FIG. 18) without passing through the electric current control mode (shown in FIG. 17).

Due to the above constitution, axis FA (42) is operated by the compliance control while following the collision force. Therefore, the collision torque can be alleviated.

Figure 14:
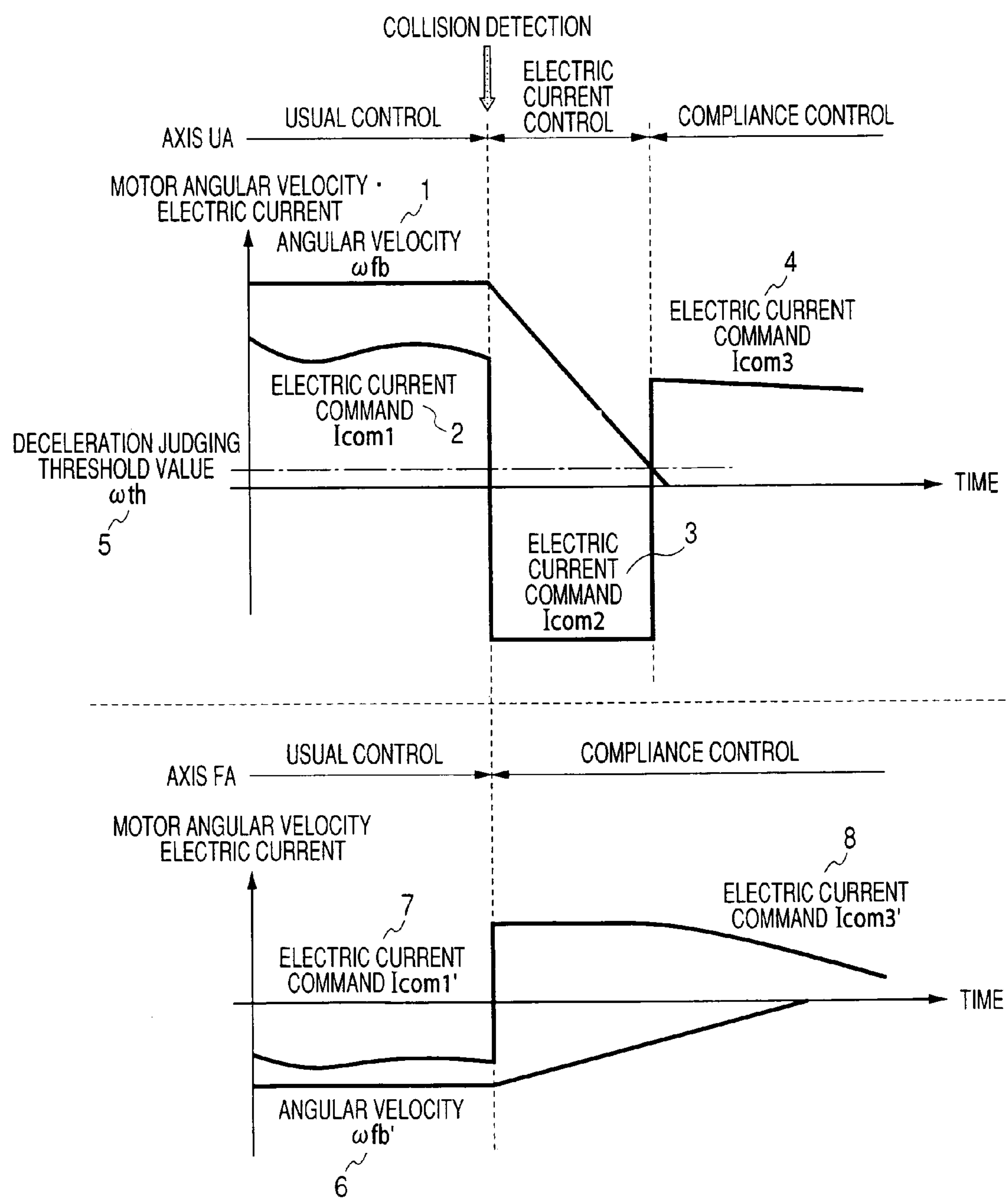
FIG. 14 is a time chart showing a collision stopping control method in the first embodiment.

FIG. 14 is a time chart showing the above control method in the time series.

Eighth Embodiment

Figure 19:
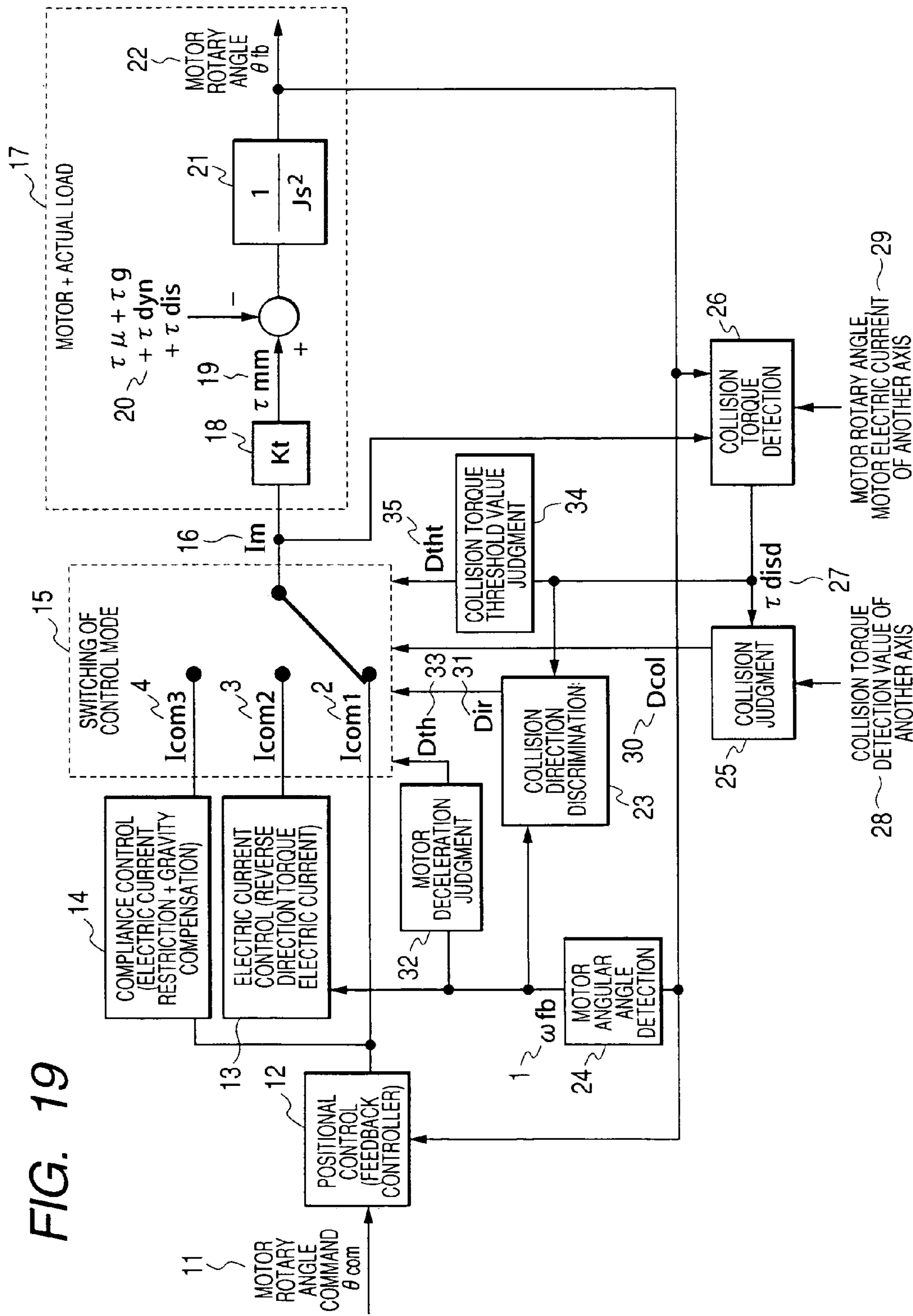
FIG. 19 is a block diagram showing a collision stopping control device (position control mode) in the second embodiment.

FIG. 19 is a view showing the eighth embodiment of the present invention.

The characteristics of the eighth embodiment shown in FIG. 19 are described as follows. With respect to FIG. 16 showing the seventh embodiment, in the embodiment shown in FIG. 19, the collision torque threshold value judging means (34) is provided which compares the collision torque detecting value $\tau_{sisd}$ (27) with the collision direction judging torque threshold value. In the case of an axis in which the collision torque detecting value $\tau_{disd}$ (27) is lower than the collision direction judging torque threshold value, irrespective of the motor rotating direction and the collision torque direction, the positional control means (12) is switched to the electric current control means (13), so that the torque, the direction of which is reverse to the motor rotating direction, can be generated by the motor and the motor rotating speed $\omega_{fb}$ (1) can be decreased. When the motor rotating speed is decreased to a value not more than the setting value, the control mode switching means (15) switches the mode to the compliance control means (14).

Referring to FIG. 19, explanations will be made into the operation and function of the collision torque threshold value judging block (34) which is an added function.

In the seventh embodiment, whether or not the control ode is shifted to the electric current control mode (shown in FIG. 17) is determined only by the collision direction flag $D_{ir}$ (31) which is decided by the expression (20).

However, concerning the collision torque detection value $\tau_{disd}$ (27) used in the condition judgment of the expression (20), in the case where the collision torque detection value $\tau_{disd}$ (27) is estimated without using a torque sensor as shown in the seventh embodiment, since the collision torque $\tau_{dis}$ is estimated from pieces of information of the mechanical parameter of the robot, the motor position, the angular velocity, the angular acceleration and the electric current, the detection error is increased as compared with the case in which the collision detecting sensor is provided.

Therefore, in the case of an axis in which the collision torque detection value $\tau_{diad}$ (27) is low and close to 0, there is a possibility that an error is caused in the sign of the collision torque detection value $\tau_{disd}$ (27) by the detection error.

In other words, in the case of an axis in which the motor velocity $\omega_{fb}$ (1) is high, that is, in the case of an axis in which the inertial energy is high, when the collision torque detection value $\tau_{disd}$ (27) is low, there is a possibility that the collision direction flag $D_{ir}$ (31) is erroneously outputted.

When the collision torque detection value τdisd (27) is higher than the predetermined collision judging threshold value τdth in an axis, the collision judging block (25) judges that a collision is caused. Therefore, in the case of an axis, the detection value of which is higher than the collision judging threshold value, no erroneous output of the collision direction flag $D_{ir}$ (31) is made.

In the case of an axis, the collision torque τdis of which is low, except for the axis in which the collision has been detected, since no strong external force is given to the axis, it is safer that the motor is quickly decelerated so as to decrease the inertial energy. However, as long as the collision direction can not be judged, it is better that the motor is not actually decelerated in some cases. Therefore, in the case where the absolute value of the velocity at the time of collision detection is low so that damage can not be given to the robot, the motor is not decelerated by giving an inverse torque to the motor. In the case where the velocity is high, the motor is not decelerated until the rotation is completely stopped but the motor should be decelerated to a velocity at which no damage is caused in the robot.

Therefore, as shown in FIG. 19, the collision torque threshold value judging block (34), which has been newly added, outputs the collision torque threshold value judging signal $D_{tht}$ (35) into the control mode switching block (15).

$$D_{tht} = \begin{cases} 1 & (|\tau disd| < \tau thr) \\ 0 & (|\tau disd| \geq \tau thr) \end{cases} \tag{23}$$

$\tau_{thr}$: Collision direction judging torque threshold value $0<\tau_{thr} \leqq \tau_{cth}$ (Collision detection judging threshold value)

As shown by the expression (23), the collision torque threshold value judging signal $D_{tht}$ (35) becomes 1 when the absolute value of the collision torque detection value $\tau_{diad}$ (27) becomes lower than the predetermined collision direction judging torque threshold value $\tau_{thr}$.

The collision direction judging torque threshold value $\tau_{thr}$ in the expression (23) may be set higher than the detection error of the collision torque detection value $\tau_{diad}$ (27) under the condition that the collision direction judging torque threshold value τthr is not more than the collision detection judging threshold value $\tau_{cth}$.

Figure 20:
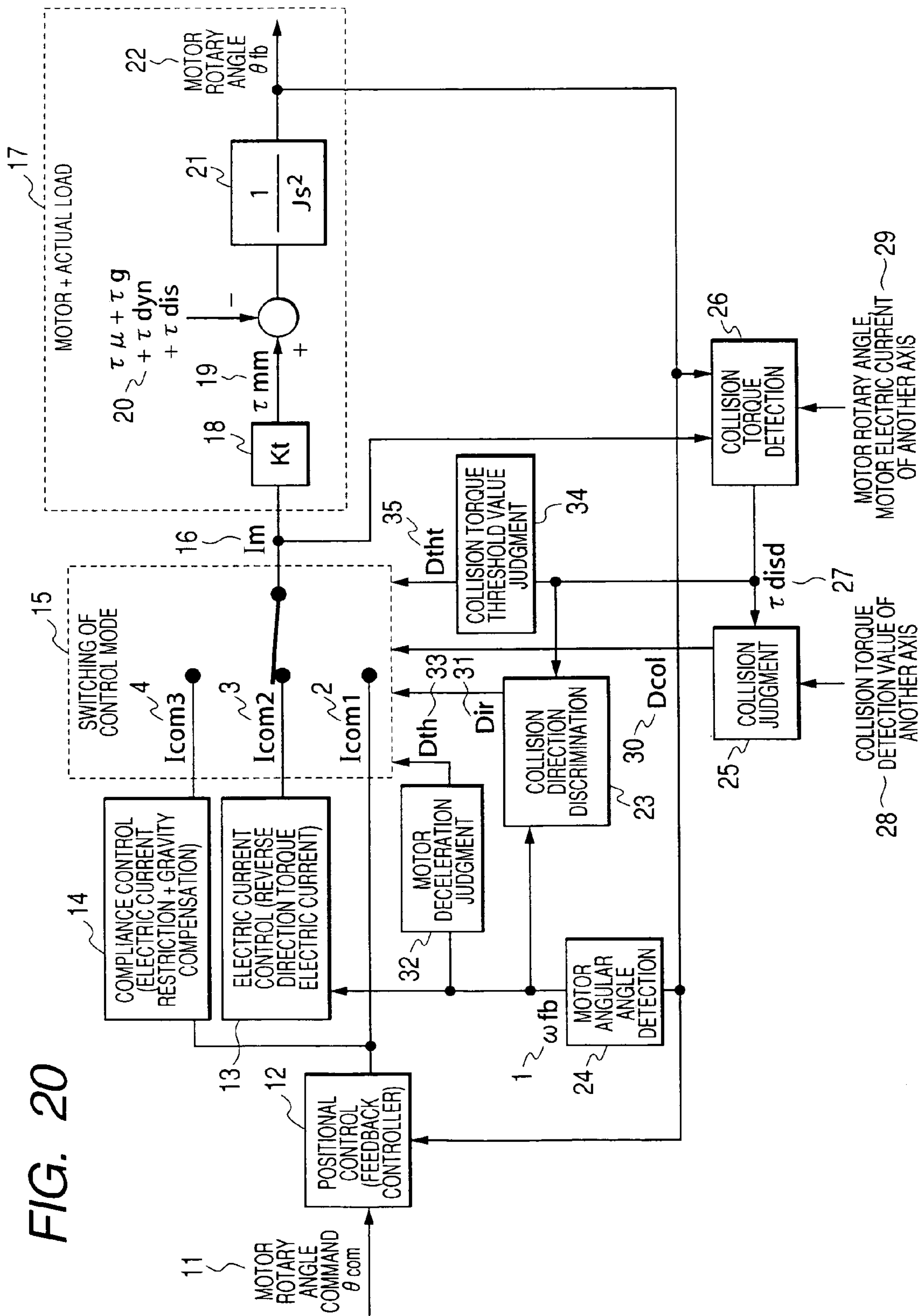
FIG. 20 is a block diagram showing a collision stopping control device (electric current control mode) in the second embodiment.

When the collision torque threshold value judging signal $D_{tht}$=1, irrespective of the collision direction flag $D_{ir}$ (31), which is an output signal of the collision velocity-torque direction judging block (23), when the collision is detected, the control mode is shifted from the usual control mode (shown in FIG. 19) to the electric current control mode (shown in FIG. 20), and the motor is decelerated. After that, the same processing as that of the seventh embodiment is conducted.

At this time, when the threshold value $\omega_{th}$ (5) in the expression (22) in the seventh embodiment is set at a value of the velocity so that the robot can not be damaged, the absolute value of the angular velocity $\omega_{fb}$ (1) at the time of collision detection is lower than the threshold value $\omega_{th}$ (5) so that the robot can not be damaged. In this case, the control mode is not shifted from the usual control mode (shown in FIG. 16) to the electric current control mode (shown in FIG. 17) but the control mode is shifted to the compliance control mode (shown in FIG. 18) without conducting deceleration by impressing the reverse torque upon the motor.

Even when the angular velocity $\omega_{fb}$ (1) at the time of collision detection is high, if the motor is decelerated to the threshold value $\omega_{th}$ (5), which is a velocity at which the robot is not damaged, the control mode is shifted to the compliance control mode (shown in FIG. 18).

When the collision torque threshold value judging signal $D_{tht}$=0, the same processing as that of the seventh embodiment is conducted.

Ninth Embodiment

In the seventh embodiment, after the collision detection, in the case of an axis in which the collision torque direction is reverse to the motor rotating direction, the control is switched from the positional control, in which an electric command for making the actual position follow the positional command is generated, to the electric current control which commands an electric current so that the torque, the direction of which is reverse to the motor rotating direction, can be generated by the motor. Due to this switching operation, the motor rotating speed is reduced and the collision energy is alleviated. After that, when the motor rotating speed is decreased to a value not more than the setting value, the control is switched to the compliance control in which th motor rotation follows the direction of the collision force so that the problem of distortion in the reduction gear caused by the collision can be solved.

However, in the case where the velocity at the time of collision detection is high, only when the control is switched to the compliance control at the time when the motor rotation is decelerated, there is a possibility that the problem of distortion in the reduction gear caused by the collision can not be sufficiently solved.

Therefore, in the case of an axis in which the motor rotating direction and the collision torque direction are reverse to each other and the motor rotating speed and the collision torque detecting value are respectively higher than the setting values, when the electric current control is conducted in which the torque, the direction of which is reverse to the direction of motor rotation, is generated by the motor, after the motor rotating speed is decreased, the torque in the reverse direction is continuously impressed until the velocity direction is inverted. After a portion of the distortion in the reduction gear generated by the collision is solved, the inverted velocity is increased to a value not less than the setting value. Then, the control is switched to the compliance control in which the motor rotation follows the collision force direction.

When the above control method is executed, the control system is complicated and the reverse torque impressing time is increased, and further there is a possibility that the robot arm greatly rebounds in the opposite direction to the collision direction. On the other hand, the problem of distortion in the reduction gear can be quickly solved.

Figure 22:
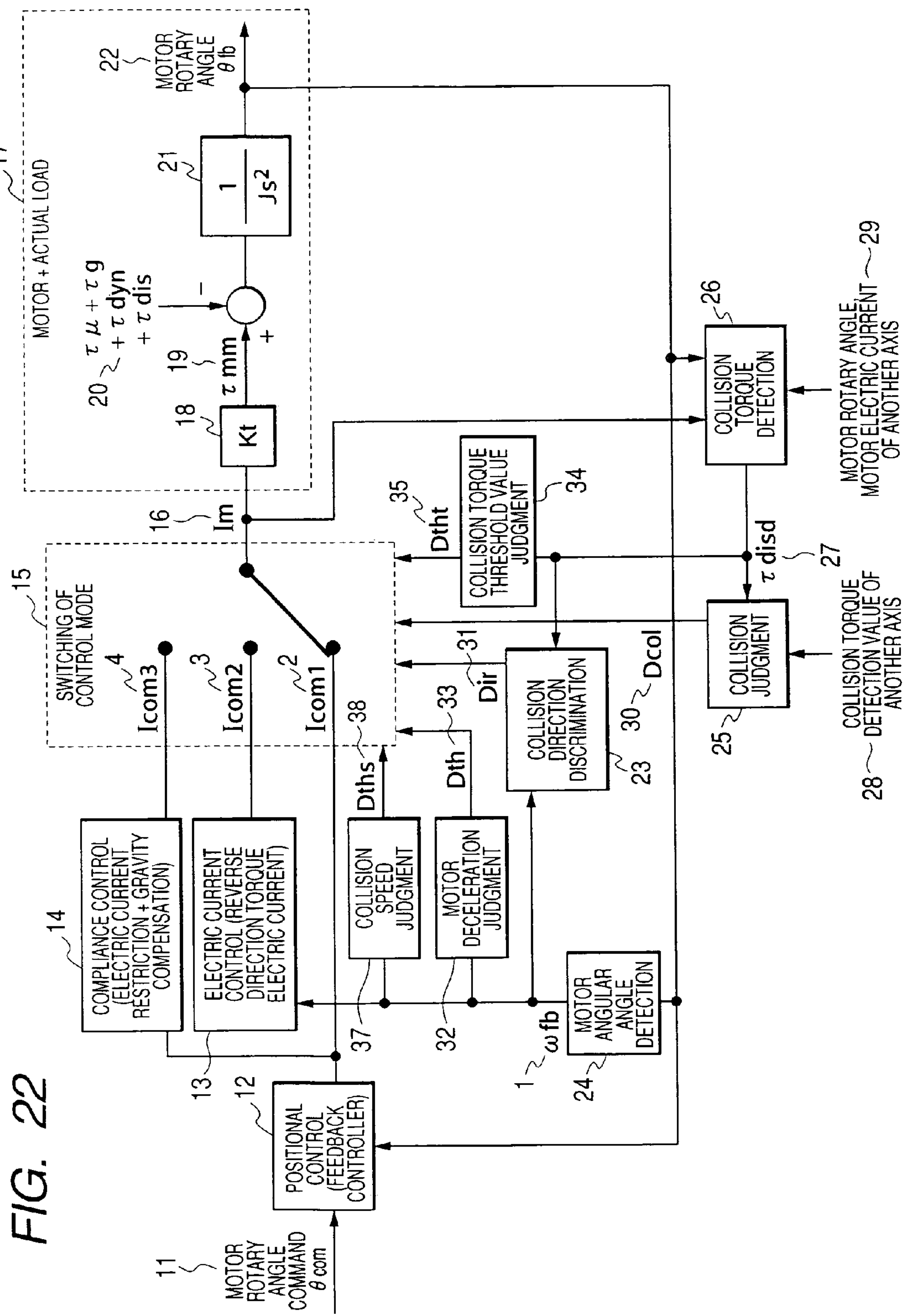
FIG. 22 is a block diagram showing a collision stopping control device (position control mode) in the third embodiment.

FIG. 22 is a view showing the ninth embodiment of the present invention.

The characteristics of the ninth embodiment shown in FIG. 22 are described as follows. With respect to FIG. 16 showing the seventh embodiment, the motor deceleration judging means (32) is changed into the motor deceleration and inversion judging means (39). In addition to the collision torque threshold value judging means (34) provided in the eighth embodiment, the collision velocity judging means (37) for judging the motor velocity at the time of collision detection is newly provided. Due to the foregoing, in the case of an axis in which the motor rotating direction and the collision torque direction are reverse to each other and it is judged that the motor rotating speed and the collision torque detection value exceed the setting values, the mode is switched to the electric current control mode in which the torque in the reverse direction to the motor rotating direction is generated by the motor. Even after the motor rotating speed has been decreased, the torque in the reverse direction is kept being impressed until the velocity direction is inverted. After a portion of the distortion in the reduction gear caused by the collision has been solved, when the inverted velocity is increased to a value not less than the setting value, the control mode is switched to the compliance control in which the motor rotation follows the collision force direction. The ninth embodiment includes the control mode switching means (15) operated as described above.

Referring to FIG. 22, explanations will be made into the operation and function of the collision velocity judging means (37), which is an adding means, and the motor deceleration and inversion judging means (39) which is a changing means.

In the seventh embodiment, the shift to the electric current control mode (shown in FIG. 17) is determined only by the collision direction flag $D_{ir}$ (31) decided by the expression (20).

In the ninth embodiment, the collision torque threshold value judging means (34), which is added to the eighth embodiment, is provided. The ninth embodiment is applied to only a case in which $D_{tht}$=0 in the expression (23), that is, only a case in which the absolute value of the collision torque detection value $\tau_{disd}$ (27) is not less than the predetermined collision direction judging torque threshold value $\tau_{thr}$ and the collision direction flag $D_{ir}$=1 (The motor rotating direction and the collision torque direction are opposite to each other.).

In the case except for the above case, control is conducted according to the control method of Embodiments 7 or 8.

In the case where the absolute value of the motor angular velocity $\omega_{fb}$ (1) is higher than the predetermined collision velocity judging threshold value $\omega_{ths}$ (39), the collision velocity judging means (37) outputs the collision velocity judging signal $D_{ths}$ (38).

$$D_{ths}=1\ (|\omega_{fb}|<\omega_{ths}) \tag{24}$$

$\omega_{ths} \geqq \omega_{th}$ (Deceleration judging threshold value)

Figure 23:
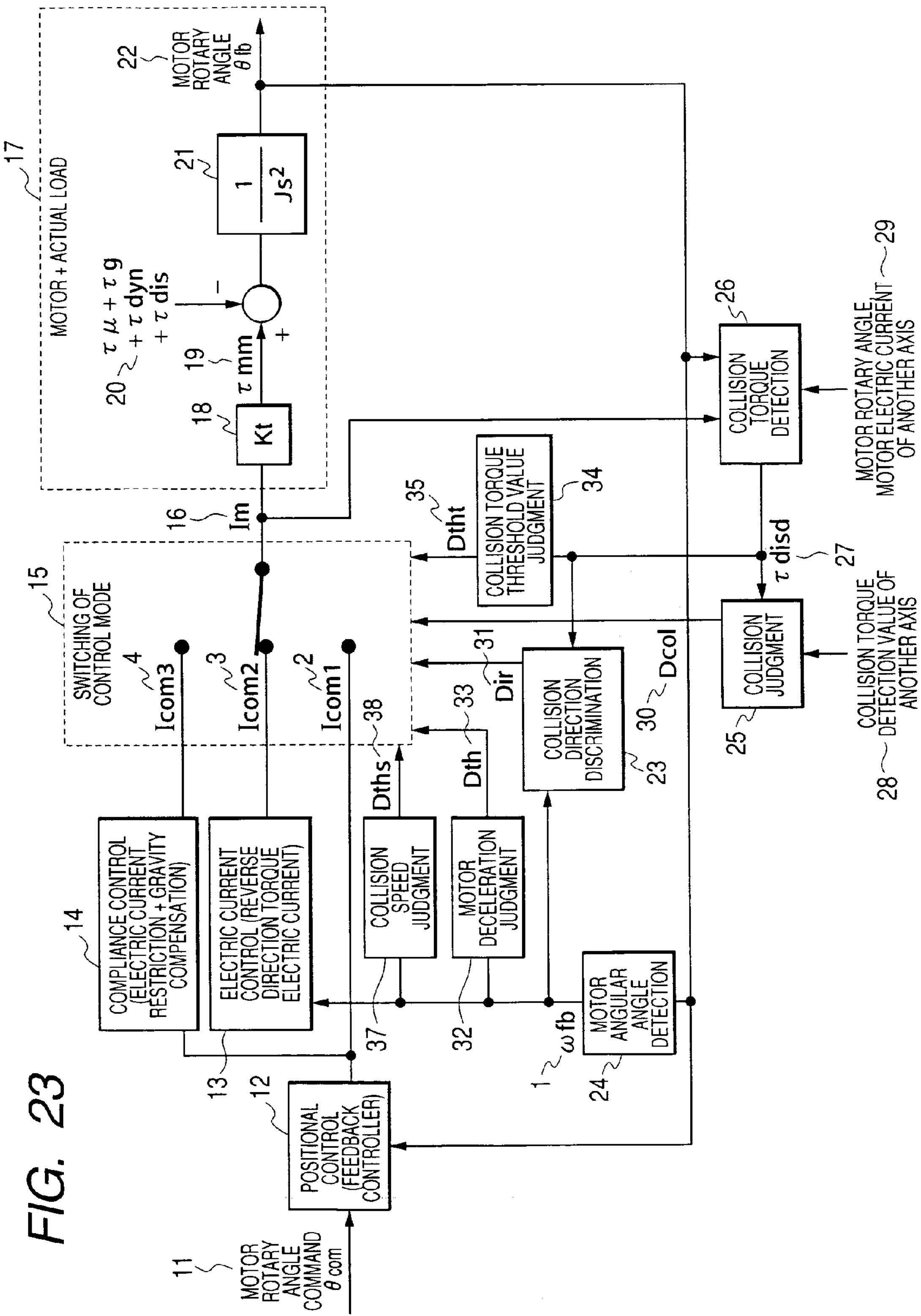
FIG. 23 is a block diagram showing a collision stopping control device (electric current control mode) in the third embodiment.

When the collision torque threshold value judging signal $D_{tht}$=0 and the collision direction flag $D_{ir}$=1, this motor deceleration judging signal $D_{ths}$=1 is outputted. Then, the control mode switching block (15) selects $I_{com2}$ (3) as the motor electric current $I_m$ (6), and the mode is shifted from the usual control mode (shown in FIG. 22) to the electric current control mode (shown in FIG. 23) in which the motor rotation is decelerated by impressing a reverse torque upon the motor.

The motor deceleration means (32) judges that the motor velocity $\omega_{fb}$ (1) is reduced and inverted by this impression of the reverse torque. Specifically, operation is conducted as follows. In the expression (22), when the motor deceleration judging signal $D_{th}$ (33) is shifted by "1 (collision)"→"0 (deceleration)"→→"1 (inversion)", the control mode switching block (15) selects $I_{com3}$ (4) as the motor electric current $I_m$ (6), and the mode is shifted to the compliance control mode shown in FIG. 24.

Figure 25:
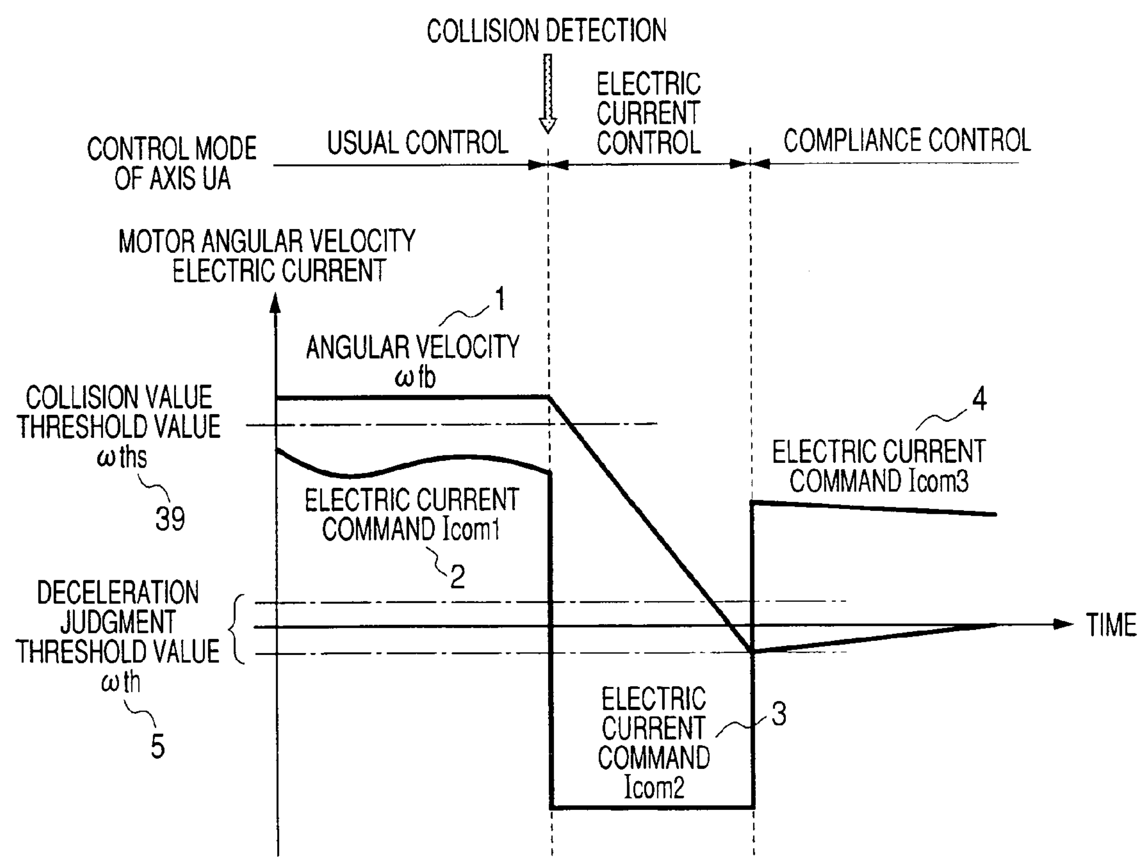
FIG. 25 is a time chart showing a collision stopping control method in the third embodiment.

FIG. 25 is a time chart showing the above control method in the time series.

Tenth Embodiment

FIG. 21 is a view showing the tenth embodiment of the present invention.

FIG. 21 shows an arrangement in which the electric current control means is changed from (13) to (36) with respect to FIG. 19 showing the eighth embodiment. The tenth embodiment includes an electric current control means (36) for commanding an electric current which generates the maximum torque of the motor in the reverse direction to the motor rotating direction when the electric current control means is selected in the control mode switching means (15).

Due to the above constitution, it is possible to conduct the maximum braking operation on the motor. Therefore, the collision energy can be alleviated so that it can be reduced as low as possible.

Of course, the same change can be made in FIG. 16 showing the seventh embodiment and FIG. 22 showing the ninth embodiment.

INDUSTRIAL APPLICABILITY

As described above, the present invention provides a method of controlling a robot characterized in that: a rotary angle of a motor for driving the robot is detected; an actually measured value of the angular velocity is calculated from the rotary angle; when the absolute value of the angular velocity of the command value calculated from the command given to the motor and the absolute value of the angular velocity of the actually measured value are compared with each other, one angular velocity, the absolute value of which is higher than the absolute value of the other angular velocity, is selected and a frictional torque is calculated with that angular velocity; when the motor is driven according to the command value, a value corresponding to the frictional torque is added to the command value given to the motor; and the frictional compensation is validly made at all times in both the case in which the robot arm is actively operated according to the angular command and the case in which the robot arm is passively operated being pushed by an external force. Due to the above characteristic, an electric current restriction by feedback control can be suppressed to be lower than the frictional torque. Therefore, a control method of higher compliance can be realized.

When at least one of the command value and the actually measured value is multiplied or added by a weighting factor at the time of the comparison of the absolute value of the velocity, either the velocity command value or the actually measured value can be preferentially adopted as a velocity. Therefore, for example, a velocity command value, the measurement error of which is small, can be preferentially selected.

Further, a value is used as an angular velocity which is obtained when at least one of the velocity command value and the actually measured value is multiplied by the friction compensation rate. Due to the foregoing, it is possible to prevent the feedback characteristic from becoming vibrational and at the same time the target following characteristic can be improved.

Further, according to the robot control method of the present invention, a dynamic frictional torque of the reduction gear, which corresponds to a loss of the torque generated by the motor, is calculated being increased proportional to the dynamic torque. Due to the foregoing, the accuracy of detecting the collision torque can be enhanced.

When the dynamic torque of the reduction gear is calculated being increased proportional to the dynamic torque, the calculation accuracy of the dynamic frictional torque can be enhanced and the most appropriate feedforward compensation can be realized.

As described above, according to the robot control method of the present invention, after the collision has been detected, when the motor rotating direction and the collision direction are opposite to each other, the control mode is switched from the positional control mode to the electric current control mode, and the motor generates the torque, the direction of which is reverse to the motor rotating direction. Due to the foregoing, the motor is decelerated and the collision energy is alleviated. After that, when the motor rotating speed is lowered to a value not more than the setting value, the control mode is switched to the compliance control and the distortion in the reduction gear generated in the collision is solved. On the other hand, in the case where the motor rotating direction and the collision direction are the same, the control mode is directly switched from the positional control to the compliance control without passing through the electric current control. When the robot arm is operated while following the collision force, the collision torque can be alleviated. When the collision stopping operation is composed as described above, damage of the robot caused by the collision can be suppressed to the minimum.

Further, in the case of an axis in which the absolute value of the collision torque detecting value is lower than the setting value, irrespective of the motor rotating direction and the collision torque direction, the control mode is switched from the positional control to the electric current control, and the torque, the direction of which is reverse to the direction of the motor rotation, is generated by the motor so as to reduce the motor rotating speed. When the motor rotating speed is decreased to a value not more than the setting value, the control mode is switched to the compliance mode. Due to the foregoing, in the case of an axis to which a high intensity of torque is given, an appropriate stopping operation is conducted according to the collision direction and the motor rotating direction. The other axis to which a high intensity of collision torque is not given is quickly stopped, so that the inertial energy can be decreased. Therefore, even in the case of collision torque detection in which a sensor is not used and a large detection error is caused, it is possible to select an appropriate stopping means.

Further, when the electric current control in which the motor generates the torque, the direction of which is reverse to the direction of motor rotation, is conducted in an axis in which the motor rotating direction and the collision torque direction are reverse to each other and the motor rotating speed and the collision torque detecting value exceed the setting values, after the motor rotating speed is reduced, the torque in the reverse direction is kept being impressed until the motor rotating speed direction is inverted. After a portion of the distortion in the reduction gear caused in the collision has been solved, when the inverted speed exceeds the setting value, when the control mode is switched to the compliance control in which the robot arm follows the collision force direction, the distortion in the reduction gear can be quickly solved.

Further, in the case of electric current control in which the motor generates torque, the direction of which is reverse to the direction of motor rotation, a command is given so that the maximum motor torque can be generated. Due to this constitution, the collision energy can be alleviated at the maximum.

The invention claimed is:

1. A method of controlling a robot arm comprising:

a step of detecting a rotary angle of a motor to drive the robot arm;

a step of calculating an actually measured angular velocity from the rotary angle;

a step of calculating a command angular velocity from a command value given to the motor;

a step of calculating a frictional torque according to one of the command angular velocity and the actually measured angular velocity, wherein an absolute value of the command angular velocity and an absolute value of the actually measured angular velocity are compared with each other and the angular velocity of a higher absolute value is used for calculating the frictional torque; and a step in which a value corresponding to the frictional torque is added to the command value given to the motor when the motor is driven according to the command value.

2. A method of controlling a robot arm according to claim 1, further comprising: a step in which at least one of the command angular velocity and the actually measured angular velocity is multiplied by a weighting factor or alternatively the weighting factor is added to at least one of the command angular velocity and the actually measured angular velocity.

3. A method of controlling a robot arm according to claim 1, further comprising: a step in which at least one of the command angular velocity and the actually measured angular velocity is multiplied by a friction compensation rate.

4. A method of controlling a robot arm driven by a motor via a reduction gear, comprising:

a step of calculating a generation torque generated by the motor;

a step of calculating a frictional torque, which includes at least a dynamic frictional torque of the reduction gear necessary for an output of the reduction gear, from the torque by an inverse dynamic calculation;

a step of increasing a dynamic torque of the reduction gear according to the frictional torque necessary for the output of the reduction gear; and a step of calculating an external force by subtracting the increased frictional torque from the generated torque.

5. A method of controlling a robot arm driven by a motor via a reduction gear, comprising:

a step of conducting a motor output torque compensation by feedforward control according to an inverse dynamic calculation of the robot for finding a torque necessary for the reduction gear output and according to a dynamic frictional torque calculation of the reduction gear, wherein the dynamic frictional torque of the reduction gear is increased in proportional to the torque necessary for the reduction gear output in the case of conducting feedback control.

6. A method of controlling a robot in a stopping operation conducted after the detection of a collision of the robot driven by a motor, in an axis in which a motor rotary direction and a collision torque direction are reverse to each other, when a control mode is switched from a positional control, in which an electric current command to make an actual position follow a positional command is generated, to an electric current control in which an electric current to generate a torque, the direction of which is reverse to the rotary direction of the motor, by the motor is commanded, a motor rotating speed is decreased, and when the motor rotating speed is decreased to a value not more than a setting value, the control mode is switched to a compliance control in which the robot follows a collision force direction; and in an axis in which the motor rotary direction and the collision torque direction are the same, the control mode is switched from the positional control to the compliance control.

7. A method of controlling a robot according to claim 6, wherein in an axis in which a collision detecting torque is lower than the setting value, irrespective of the motor rotary direction and the collision torque direction, the control mode is switched from the positional control to the electric current control, and when a torque, the direction of which is reverse to the direction of the motor rotation, is generated by the motor, the motor rotating speed is reduced, and when the motor rotating speed is reduced to a value not more than the setting value, the control mode is switched to the compliance control.

8. A method of controlling a robot according to claim 6, wherein when the electric current control is conducted in which a torque, the direction of which is reverse to the motor rotary direction, is generated by the motor in an axis in which the motor rotary direction and the collision torque direction are reverse to each other and the motor rotating speed and the collision torque detection value exceed the setting values, after the motor rotating speed is reduced, a torque in the reverse direction is kept being impressed until the speed direction is inverted, and when the motor rotating speed is increased to a value not less than the setting value, the control mode is switched to the compliance control in which the robot follows the collision force direction.

9. A method of controlling a robot according to claim 6, wherein when the electric current control, in which a torque, the direction of which is reverse to the direction of motor rotation, is generated by the motor, is conducted after the collision detection, an electric current to generate the maximum torque of the motor is commanded.

10. A device of controlling a robot comprising:

a collision torque detecting means for detecting an intensity and direction of torque given to a motor, which drives an arm of the robot, by a collision force given to the arm of the robot;

a collision judgment means for judging a collision by comparing the collision torque detecting value with the threshold value of the collision torque which has been set;

a motor rotation detecting means for detecting a rotating speed and a rotating direction of the motor;

a collision direction discriminating means for comparing the collision torque detecting direction with the motor rotary direction; and a motor deceleration judging means for confirming a deceleration of the motor by comparing the motor rotating speed with the threshold value which has been set, wherein in an axis in which a motor rotary direction and a collision torque direction are reverse to each other, when a control mode is switched from a positional control, in which an electric current command to make an actual position follow a positional command is generated, to an electric current control in which an electric current to generate a torque, the direction of which is reverse to the rotary direction of the motor, by the motor is commanded, a motor rotating speed is decreased, and when the motor rotating speed is decreased to a value not more than the setting value, the control mode is switched to a compliance control in which the robot follows a collision force direction, a device of controlling a robot further comprising a control mode switching means for switching from a positional control means to a compliance control means in an axis in which the motor rotary direction and the collision torque direction are the same.

11. A device of controlling a robot according to claim 10, further comprising:

a collision torque threshold value judging means for comparing the collision torque detection value with a collision direction discriminating torque threshold value; and a control mode switching means for switching the control mode from the positional control means to the electric current control means in an axis, in which the collision torque detection value is lower than the collision direction discriminating torque threshold value, irrespective of the motor rotary direction and the collision torque direction and for switching the control mode to the compliance control means when the motor rotating speed is reduced by generating a torque, the direction of which is reverse to the direction of the motor rotation, by the motor so as to reduce the rotating speed of the motor and the rotating speed of the motor is reduced to a value not more than the setting value.

12. A device of controlling a robot according to claim 10, wherein when the electric current control is conducted in which a torque, the direction of which is reverse to the motor rotary direction, is generated by the motor in an axis in which the motor rotary direction and the collision torque direction are reverse to each other and the motor rotating speed and the collision torque detection value exceed the setting values, after the motor rotating speed is reduced, a torque in the reverse direction is kept being impressed until the speed direction is inverted, and when the inverted motor rotating speed is increased to a value not less than the setting value, the control mode is switched to the compliance control in which the robot follows the collision force direction.

13. A device of controlling a robot according to claim 10, further comprising: an electric current control means for commanding an electric current to generate the maximum torque by the motor, the direction of which is reverse to the direction of the motor rotation, when the electric current control means is selected by the control mode switching means after the collision has been detected.

* * * * *